(12) United States Patent
Tochio

(10) Patent No.: US 6,215,567 B1
(45) Date of Patent: Apr. 10, 2001

(54) OPTICAL TRANSMITTING APPARATUS AND OPTICAL RECEIVING APPARATUS, AND OPTICAL COMMUNICATING METHOD

(75) Inventor: Yuji Tochio, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/013,539

(22) Filed: Jan. 26, 1998

(30) Foreign Application Priority Data

Sep. 10, 1997 (JP) .................................................... 9-245591

(51) Int. Cl.[7] ...................................................... H04J 14/02
(52) U.S. Cl. ........................ 359/125; 359/123; 359/137; 359/189; 359/193
(58) Field of Search ................................... 359/125, 123, 359/137, 189, 193

(56) References Cited

U.S. PATENT DOCUMENTS

| | | | |
|---|---|---|---|
| 5,119,223 | * | 6/1992 | Panzer et al. .......................... 359/123 |
| 5,398,129 | * | 3/1995 | Reimann ............................... 359/137 |
| 5,572,349 | * | 11/1996 | Hale et al. ............................. 359/137 |
| 5,600,466 | * | 2/1997 | Tsushima et al. ..................... 359/124 |
| 5,659,351 | * | 8/1997 | Huber ......................................... 348/7 |
| 5,737,106 | * | 4/1998 | Sansonetti et al. ................... 359/140 |
| 5,739,934 | * | 4/1998 | Nomura et al. ....................... 359/124 |
| 5,748,348 | * | 5/1998 | Heidemann et al. ................. 359/125 |
| 5,854,701 | * | 12/1998 | Clarke et al. ......................... 359/137 |
| 5,912,749 | * | 6/1999 | Harstead et al. ...................... 359/123 |
| 5,938,309 | * | 8/1999 | Taylor ................................... 359/124 |

* cited by examiner

*Primary Examiner*—Leslie Pascal
*Assistant Examiner*—Hanh Phan
(74) *Attorney, Agent, or Firm*—Staas & Halsey LLP

(57) ABSTRACT

An optical transmitting apparatus used in an optical communicating system in an optical communication network using a broad-band characteristic of fibers, which can transmit wavelength division multiplexed optical signals over the optical communication network, has an optical signal generating unit for generating optical signals for the respective plural opposite apparatus by using a combination of p (p; an integer not less than 2) wavelengths set in advance for each of the plural opposite apparatus, and a wavelength division multiplexing transmitting unit for wavelength division multiplexing the optical signals generated by the optical signal generating unit and transmitting the optical signals, thereby accommodating subscriber terminals larger in number than the number of times of wavelength division multiplexing while realizing privacy protection.

18 Claims, 24 Drawing Sheets

FIG.6(a)

|    | (t1) | (t2) | (t3) | (t4) | (t5) |
|----|------|------|------|------|------|
| λ1 | 30-1 | 30-3 | 30-6 | 30-9 |      |
| λ2 | 30-1 | 30-4 | 30-7 | 30-10|      |
| λ3 | 30-2 | 30-4 | 30-6 | 30-8 |      |
| λ4 | 30-2 | 30-5 | 30-7 | 30-9 |      |
| λ5 | 30-3 | 30-5 | 30-8 | 30-10|      |

TIME →

FIG.6(b)

|    | (t1) | (t2) | (t3) | (t4) | (t5) |
|----|------|------|------|------|------|
| λ1 | 30-1 | 30-4 | 30-7 | 30-10| 30-13|
| λ2 | 30-1 | 30-5 | 30-8 | 30-11| 30-15|
| λ3 | 30-2 | 30-4 | 30-9 | 30-11| 30-14|
| λ4 | 30-2 | 30-6 | 30-7 | 30-12| 30-15|
| λ5 | 30-3 | 30-5 | 30-9 | 30-10| 30-14|
| λ6 | 30-3 | 30-6 | 30-8 | 30-12| 30-13|

TIME →

FIG. 8

| HEADER INFORMATION | DESTINATIONS OF DMUXs | | THE ORDER OF READING SIGNALS IN THE MULTIPLEXING UNITS 14-1~14-n |
| --- | --- | --- | --- |
| | DMUX 13-1 | DMUX 13-2 | |
| 0100100-- | 14-1 --- | 14-2 --- | A NUMERICAL VALUE FROM 1 TO (n-1) IS GIVEN TO EACH HEADER SIGNAL ON THE BASIS OF A TIMING CHART |

← 12a

| HEADER INFORMATION (USER ID) | DESTINATIONS OF DMUXs | | THE ORDER OF READING SIGNALS IN THE MULTIPLEXING UNITS 14-1~14-n |
|---|---|---|---|
| | 13-1 | 13-2 | |
| 1 | 14-1 | 14-2 | 1 |
| 2 | 14-3 | 14-4 | 1 |
| 3 | 14-1 | 14-4 | 2 |
| 4 | 14-2 | 14-3 | 2 |
| 5 | 14-1 | 14-3 | 3 |
| 6 | 14-2 | 14-4 | 3 |

12a'

FIG.14(a) $\lambda i \atop \lambda j$ — 31, 32 — i
30e-1

FIG.14(b) $\lambda i \atop \lambda j$ — 33, 34 — j
30e-2

| S | C | D |
|---|---|---|
| 1 | EXOR OF A AND B | B |
| 0 | A | B |

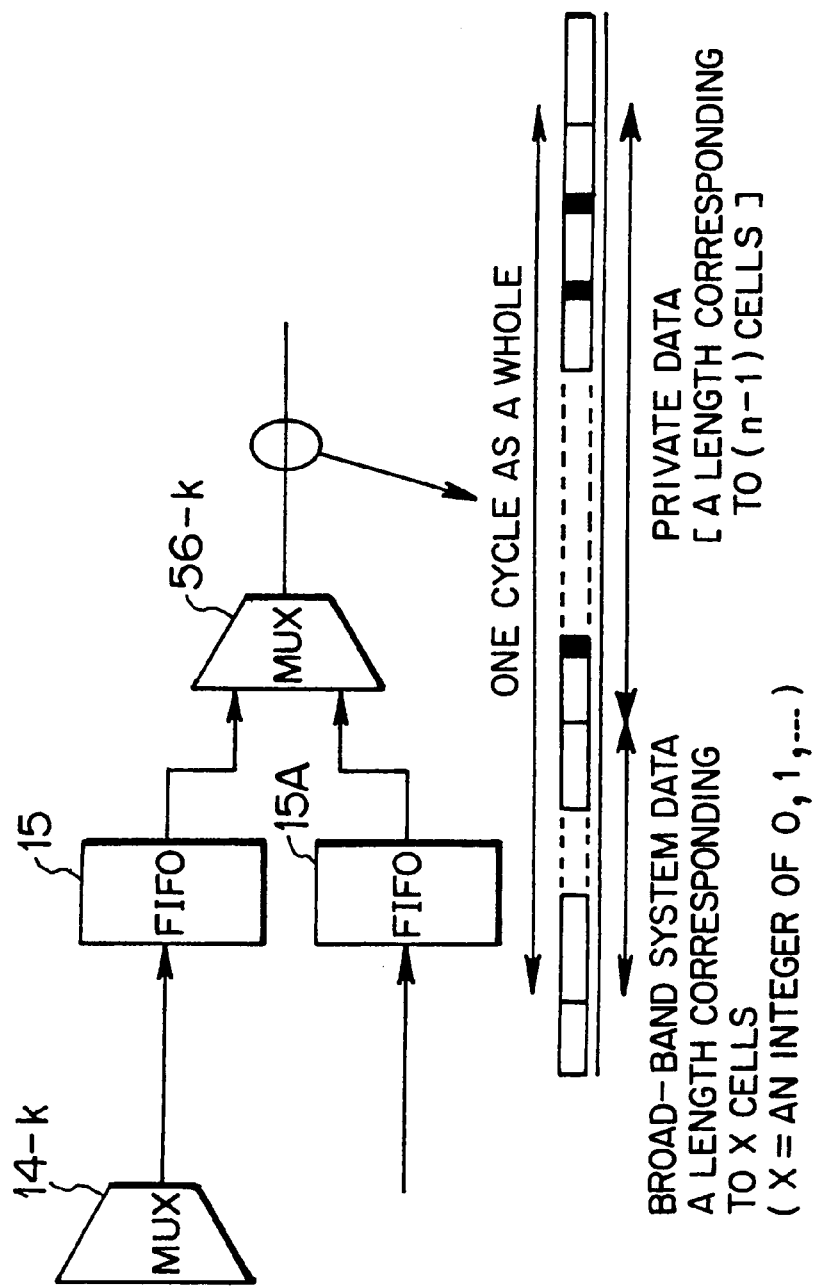

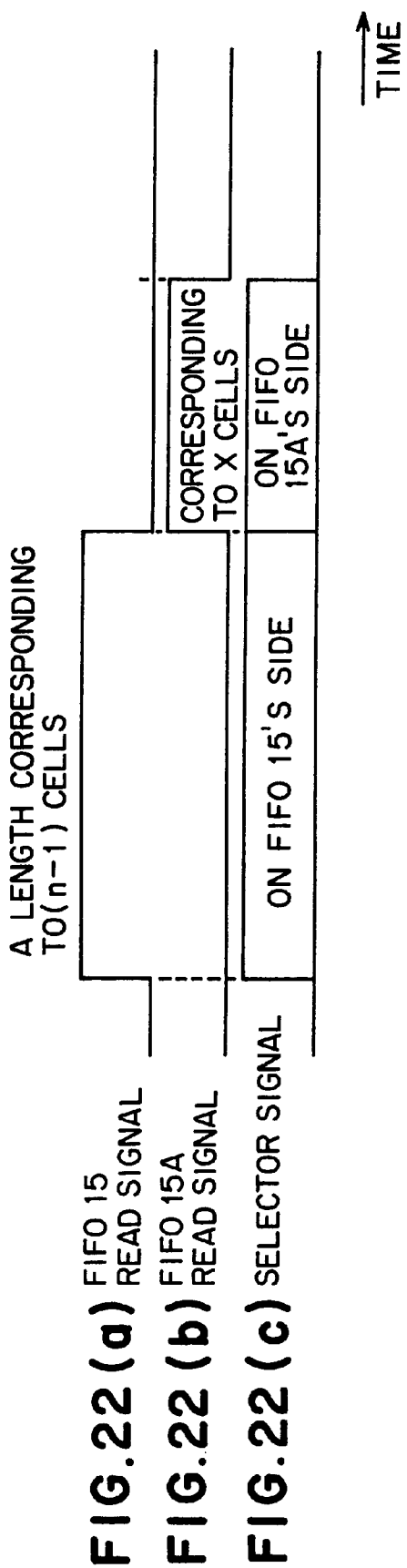

FIG. 23

| HEADER INFORMATION | DESTINATIONS OF DMUXs | | THE ORDER OF READING SIGNALS IN THE MULTIPLEXING UNITS 14-1~14-n | THE ORDER OF READING SIGNALS IN THE MUXs 56-1~56-n |
|---|---|---|---|---|
| | DMUX 13-1 | DMUX 13-2 | | |
| 0100100-- | 14-1 | 14-2 | GIVE A NUMERICAL VALUE FROM 1 TO (n-1) TO EACH HEADER SIGNAL ON THE BASIS OF THE TIMING CHART. A TIMING LENGTH CORRESPONDS TO ONE CELL | A TIMING LENGTH CORRESPONDS TO (n-1) CELLS |
| 1111010-- (FOR BROAD-/ MULTI-BAND) | — | — | — | A TIMING LENGTH CORRESPONDS TO AN INTEGRAL NUMBER NOT LESS THAN 1 OF CELLS (REFER TO FIGS. 21 & 22) AS TO MULTICASTING, REFER TO FIG.24. |

| HEADER INFORMATION (USER ID) | DESTINATIONS OF THE SELECTORS | | THE ORDER OF READING SIGNALS IN THE MULTIPLEXING UNITS 14-1~14-n |
|---|---|---|---|
| | 1 | 2 | |
| ① | 14-1 | 14-2 | 1 |
| 2 | 14-3 | 14-4 | 1 |
| 3 | 14-1 | 14-4 | 2 |
| ④ | 14-2 | 14-3 | 2 |
| ⑤ | 14-1 | 14-3 | 3 |
| 6 | 14-2 | 14-4 | 3 |

12b'

OPTICAL TRANSMITTING APPARATUS AND OPTICAL RECEIVING APPARATUS, AND OPTICAL COMMUNICATING METHOD

BACKGROUND OF THE INVENTION

The present invention relates to an optical transmitting apparatus and an optical receiving apparatus, and an optical communicating method suitable for use in an optical communicating system for an optical communication network utilizing broad band characteristics of fibers.

The optical communication network can transmit a large volume of information as compared with a network using general copper cables. In recent years, the optical communication network draws attention as a network which provides a multi-media service such as CATV (Cable Television), VOD (Video on Demand) or the like.

FIG. 26 is a block diagram showing an example of an optical communicating system for providing a multi-media service. In an optical communicating system 100 shown in FIG. 26, a single station 101 is connected to an optical coupler 102 on a transmission route through one optical fiber 103, and a plurality (n, here) of subscriber terminals 104-1 through 104-n are connected to the optical coupler 102 through respective exclusive optical fibers 103-1 through 103-n.

Between the station 101 and each of the subscriber terminals 104-1 through 104-n, optical signals are transmitted and received in wavelength division multiplexing. Namely, the station 101 can multiplex signals of wavelengths $\lambda$ 1 through $\lambda$ n, and transmit and receive the signals through the optical fiber 103.

The optical coupler 102 demultiplexes the wavelength division multiplexed optical signal fed through the optical fiber 103 into optical signals of wavelengths $\lambda$ 1 through $\lambda$ n, and transmits the demultiplexed optical signals to the subscriber terminals 104-1 through 104-n through the optical fibers 103-1 through 103-n, respectively.

The optical coupler 102 couples optical signals (having wavelengths $\lambda$ 1 through $\lambda$ n, respectively) each of a single wavelength incident from the subscriber terminals 104-1 through 104-n through the respective optical fibers 103-1 through 103-n, and outputs the optical signals as a wavelength division multiplexed signal to the optical fiber 103 on the side of the station 101.

The above optical communicating system 100 as shown in FIG. 26 is configured between the station 101 and the subscriber terminals 104-1 through 104-n, whereby a routing (data transmission) in a wavelength for each subscriber and a band for each subscriber can be increased.

However, the optical communicating system 100 using the above wavelength division multiplexing technique as shown in FIG. 26 has a disadvantage such that the number of subscribers is limited to the number of wavelengths which can be multiplexed. If it is desired to increase the number of subscribers, it is considered an optical communicating system 100A in which the above wavelength division multiplexing system employed in FIG. 26 is combined with a time division multiplexing system.

Namely, in the optical communicating system 100A employing the time division multiplexing system as shown in FIG. 27, transmit-receive signals for three subscriber terminals 104-u, 104-v and 104-w (u, v, w; different integers from 1 to n) are assigned to optical signals having the same wavelength $\lambda$ i, and each of the subscriber terminals 104-u, 104-v and 104-w extracts a signal addressed to itself from the optical signals of the same wavelength $\lambda$ x (x; an integer from 1 to n) from the station 101 using a unique clock signal.

However, the above optical communication network shown in FIG. 27 has a low extensibility of the network to increase the number of subscribers of the optical communicating system. In addition, there is a possibility that the subscriber terminals 104-u, 104-v and 104w may receive a signal addressed to another terminal depending on setting of a clock signal or the like. Therefore, there is required an improvement in security (so-called privacy protection).

In the light of the above problems, an object of the present invention is to provide an optical transmitting apparatus and an optical receiving apparatus, and an optical communicating method, which can accommodate subscribers larger in number than wavelengths multiplexed, while realizing privacy protection.

SUMMARY OF THE INVENTION

The present invention therefore provides an optical transmitting apparatus being able to transmit wavelength division multiplexed optical signals to a plurality of opposite apparatus as destinations over an optical communication network comprising an optical signal generating unit for generating an optical signal for each of the plurality of opposing apparatus using a combination of p (p; an integer not less than 2) optical wavelengths set in advance for each of the plurality of opposite apparatus, and a wavelength division multiplexing transmitting unit for wavelength division multiplexing the optical signals generated by the optical signal generating unit and transmitting the multiplexed optical signals.

The optical transmitting apparatus according to this invention uses a combination of p optical wavelengths set in advance for each of a plurality of opposite apparatus (optical receiving apparatus, receiving side apparatus) to generate optical signals for each of the plural opposite apparatus, and transmits the wavelength division multiplexed optical signals from the wavelength division multiplexing transmitting unit over an optical communication network. It is therefore possible to configure an optical communicating system which can accommodate subscribers m larger in number than wavelengths n which can be wavelength division multiplexed and transmitted so as to efficiently use a transmission band of the optical communication system and increase extensibility of the network while keeping an existing performance of wavelength division multiplexing of the network.

The present invention also provides an optical receiving apparatus comprising a wavelength filtering unit for filtering signals of p (p; an integer not less than 2) optical wavelengths set in advance for each of the optical receiving apparatus among wavelength division multiplexed signals transmitted from a transmitting side apparatus over an optical communication network, p photoelectric converting units for converting the signals of the p optical wavelengths filtered by the wavelength filtering unit into electric signals, and a data restoring unit for restoring data addressed to its own apparatus on the basis of the electric signals converted by the photoelectric converting units.

The optical transmitting apparatus according to this invention uses a combination of p optical wavelengths set in advance for each of a plurality of opposite apparatus (optical receiving apparatus, receiving side apparatus) to generate optical signals for each of the plural opposite apparatus, and transmits the wavelength division multiplexed optical signals from the wavelength division multiplexing transmitting unit over an optical communication network. It is therefore possible to configure an optical communicating system which can accommodate subscribers m larger in number than wavelengths n which can be wavelength division multiplexed and transmitted so as to efficiently use a transmission band of the optical communication system and increase extensibility of the network while keeping an existing performance of wavelength division multiplexing of the network.

The present invention still also provides an optical communicating method comprising the steps of, when a transmitting side apparatus transmits wavelength division multiplexed optical signals to a plurality of receiving side apparatus opposite to the transmitting side apparatus over an optical communication network, on the transmitting side apparatus, generating optical signals for each of the plural receiving side apparatus on the basis of a combination of p (p: an integer not less than 2) optical wavelengths set in advance for each of the plural receiving side apparatus and wavelength division multiplexing the generated optical signals to transmit the optical signals, and on the receiving side apparatus, filtering p optical signals having different wavelengths uniquely set in advance among the wavelength division multiplexed signals transmitted from the transmitting side apparatus over the optical communication network, then, converting the filtered p optical signals having different wavelengths into electric signals in p photoelectric converting units, further, restoring data addressed to itself on the basis of the converted electric signals.

The optical transmitting apparatus according to this invention uses a combination of p optical wavelengths set in advance to each of a plurality of opposite apparatus (optical receiving apparatus, receiving side apparatus) to generate optical signals for each of the plural opposite apparatus, and transmits the wavelength division multiplexed optical signals from the wavelength division multiplexing transmitting unit over an optical communication network. It is therefore possible to configure an optical communicating system which can accommodate subscribers m larger in number than wavelengths n which can be multiplexed and transmitted so as to efficiently use a transmission band of the optical communication system and increase extensibility of the network while keeping an existing performance of wavelength division multiplexing of the network.

BRIEF DESCRIPTION OF THE DRAWINGS

FIGS. 6(a) and 6(b) are timing charts for illustrating a wavelength setting mode and a signal transmitting mode according to the first embodiment of this invention;

FIG. 8 is a diagram showing a structure of a table that should be referred by the controlling unit of the station according to the first embodiment of this invention;

FIG. 9(a) is a timing chart for illustrating the wavelength setting mode and the signal transmitting mode according to the first embodiment, whereas FIG. 9(b) is a diagram showing a structure of a table that should be referred by the controlling unit of the station according to the first embodiment;

FIGS. 14(a) and 14(b) are diagrams for illustrating a modification of the first embodiment of this invention;

FIGS. 21, and 22(a) through 22(c) are diagrams for illustrating an operation of the station according to the third embodiment of this invention;

FIG. 23 is a diagram showing a structure of a table that should be referred by a controlling unit of the station according to the third embodiment of this invention;

FIG. 24 is a diagram showing a structure of a table that should be referred by a controlling unit of a station according to a modification of the third embodiment of this invention;

DESCRIPTION OF THE PREFERRED EMBODIMENTS (a) Description of an Aspect of the Invention Hereinafter, description will be made of an aspect of the present invention with reference to the drawings.

Figure 1:
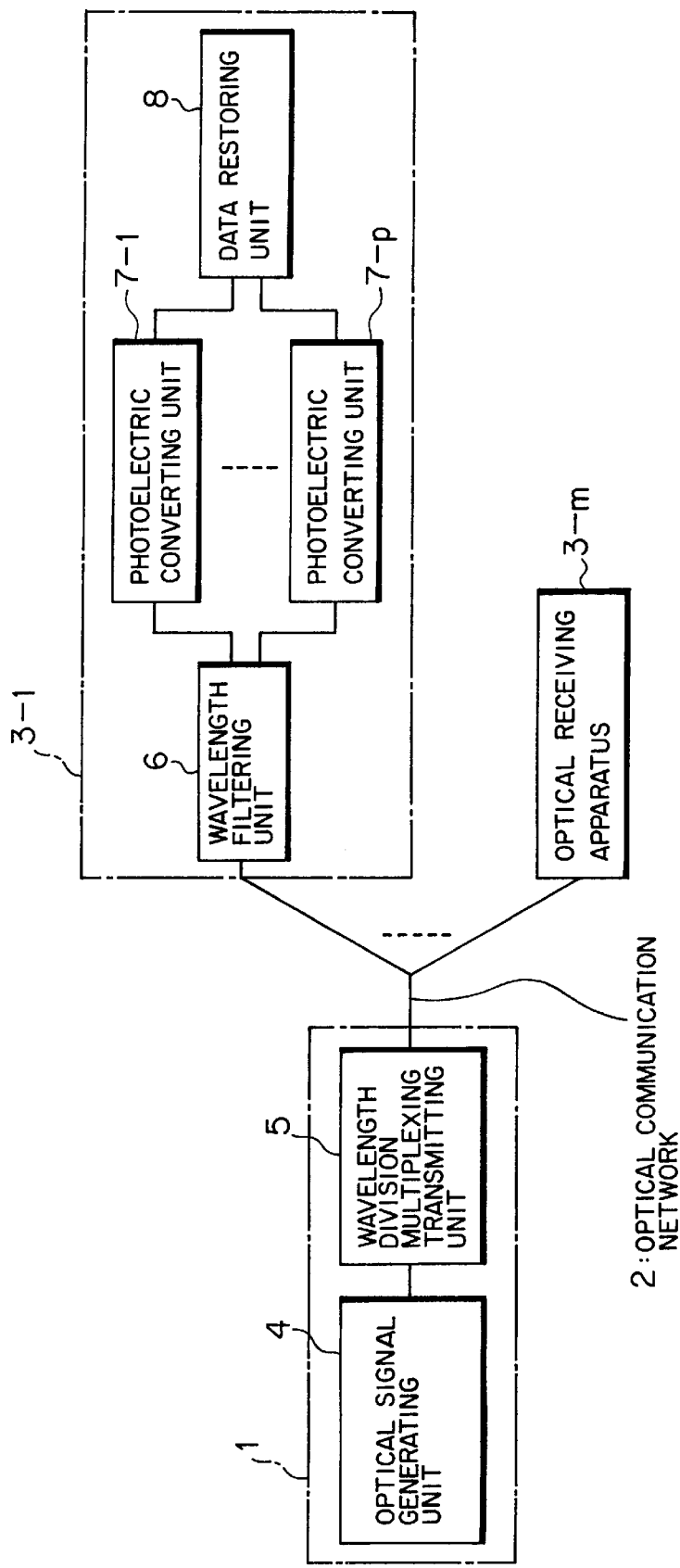
FIG. 1 is a block diagram showing a principle of this invention.

FIG. 1 is a block diagram showing a principle of this invention. In FIG. 1, reference numeral 1 denotes an optical transmitting apparatus (transmitting side apparatus). The optical transmitting apparatus 1 can transmit wavelength division multiplexed optical signals to optical receiving apparatus (receiving side apparatus) 3-1 through 3-m (m; an integer not less than 2) as a plurality of opposite apparatus over an optical communication network 2, which has an optical signal generating unit 4 and a wavelength division multiplexing transmitting unit 5.

The optical signal generating unit 4 uses a combination of p (p; an integer not less than 2) optical wavelengths set in advance for each of the plural opposite apparatus 3-1 through 3-*m* to generate optical signals for each of the plural opposite apparatus 3-1 through 3-*m*. The wavelength division multiplexing transmitting unit 5 wavelength division multiplexes the optical signals generated by the optical signal generating unit 4.

Each of the optical receiving apparatus 3-1 through 3-*m* receives the wavelength division multiplexed signals transmitted from the above optical transmitting apparatus 1 over the optical communication network 2 to restore data addresses to itself from the wavelength division multiplexed signals, which has a wavelength filtering unit 6, a photoelectric converting units 7-1 through 7-*p* and a data restoring unit 8. Incidentally, FIG. 1 shows in detail only the optical receiving apparatus 3-1. However, the other optical receiving apparatus 3-2 through 3-*m* each has the same structure.

The wavelength filtering unit 6 filters signals of p (p: an integer not less than 2) optical wavelengths set for each of the apparatus (each of the optical receiving apparatus 3-1 through 3-*m*) among the wavelength division multiplexed optical signals transmitted from the optical transmitting apparatus 1.

The photoelectric converting units 7-1 through 7-*p* are provided correspondingly to the number of the signals of p optical wavelengths filtered by the wavelength filtering unit 6 to convert each of the signals of p optical wavelengths into an electric signal. The data restoring unit 8 restores data addressed to its own apparatus on the basis of the electric signals converted by the photoelectric converting units 7-1 through 7-*p*.

The transmitting side apparatus 1 (optical transmitting apparatus) and each of the receiving side apparatus (opposite apparatus, optical receiving apparatus) 3-1 through 3-*m* operate as follows when the transmitting side apparatus 1 transmits wavelength division multiplexed optical signals to a plurality of the receiving side apparatus 3-1 through 3-*m* opposite to the transmitting side apparatus 1 over an optical communication network.

Namely, the transmitting side apparatus 1 generates optical signals for each of the above plural receiving side apparatus 3-1 through 3-*m* on the basis of a combination of p (p; an integer not less than 2) optical wavelengths set in advance for each of the plural receiving side apparatus 3-1 through 3-*m*, wavelength division multiplexes the optical signals generated for the plural receiving side apparatus.

In each of the receiving side apparatus 3-1 through 3-*m*, the wavelength filtering unit 6 filters p optical signals having different wavelengths uniquely set in advance among the wavelength division multiplexed optical signals transmitted from the transmitting side apparatus 1 over the optical communication network 2, the p photoelectric converting units 7-1 through 7-*p* convert the filtered p optical signals having different wavelengths into electric signals, and the data restoring unit 8 restores data addressed to its own apparatus on the basis of the converted electric signals.

The optical signal generating unit 4 of the above optical transmitting apparatus 1 may have a data replicating unit inputted input data addressed to the plural opposite apparatus 3-1 through 3-*m* as a time division multiplexed signal to replicate the input data into p data and output the data, a data demultiplexing unit for time division demultiplexing the p data replicated by the data replicating unit into data addressed to the respective opposite apparatus 3-1 through 3-*m*, and a signal converting unit for converting the data demultiplexed by the data demultiplexing unit into signals having p optical wavelengths set in advance for each of the opposite apparatus which are destinations.

The signal converting unit may have a plurality of multiplexing units for multiplexing the data demultiplexed by the data demultiplexing unit, which should be converted into optical signals having optical wavelengths according to a destination, and a plurality of optical converting units being able to convert the plurality of multiplexed data from the plurality of multiplexing units into optical signals having optical wavelengths different from one another.

In this case, it is possible to set the above combination of p wavelengths such that the combination of the wavelengths differs from one another according to each of the above opposite apparatus 3-1 through 3-*m*. It is also possible to provide dependency to the order of optical wavelengths that should be converted into the above optical signals in the signal converting unit when the signal converting unit converts the above multiplexed data into p optical signals according to the above destination.

Further, the above optical signal generating unit 4 may have a bit demultiplexing unit inputted input data addressed to the plurality of opposite apparatus 3-1 through 3-*m* as a time division multiplexed signal to time division demultiplex the above input data into p (p; an integer not less than 2) groups of bits, a data demultiplexing unit for time division demultiplexing the data time division demultiplexed into p groups of data by the bit demultiplexing unit into data addressed to the respective opposite apparatus 3-1 through 3-*m*, and a signal converting unit for converting data time division demultiplexed by the bit demultiplexing unit into optical signals having p optical wavelengths set in advance for each of the opposite apparatus 3-1 through 3-*m* which are destinations, and the wavelength division multiplexing transmitting unit 5 may wavelength division multiplex the optical signals converted by the signal converting unit for all of the opposite apparatus 3-1 through 3-*m* and transmit the optical signals.

Still further, the optical signal generating unit 4 may have a scramble processing unit inputted input data addressed to the plurality of opposite apparatus 3-1 through 3-*m* as time division multiplexed signals to perform a scrambling process on the input data according to a destination, and a signal converting unit for converting the data subjected to the scrambling process by the above scramble processing unit and a scrambler pattern into optical signals having p optical wavelengths set in advance for each of the opposite apparatus 3-1 through 3-*m* which are destinations, and the wavelength division multiplexing transmitting unit 5 may wavelength division multiplex optical signals converted by the signal converting unit for all of the opposite apparatus 3-1 through 3-*m* and transmit the optical signals.

The signal converting unit may convert plural destinations transmit information along with private information that should be prevented from being received by an apparatus other than the opposite apparatus 3-1 through 3-*m* which are destinations into the above optical signals. In which case, the signal converting unit may convert the above plural destinations transmit information into the optical signals using optical wavelengths set for each of the opposite apparatus which are destinations.

If only broad-band type data is transmitted, the optical signal generating unit 4 in the optical transmitting apparatus 1 of this invention may generate optical signals without using a combination of p optical wavelengths set in advance for each of the opposite apparatus 3-1 through 3-m which are destinations.

When any one of the p photoelectric converting units becomes unusable, the data restoring unit 8 of the optical receiving apparatus 3-1, 3-2, . . . or 3-m of this invention may restore the above data on the basis of the electric signals converted by the remaining usable photoelectric converting units 7-1 through 7-p.

When at least one of the photoelectric converting units 7-1 through 7-p becomes unusable in any one of the plural receiving side apparatus 3-1 through 3-m, the transmitting side apparatus 1 may perform the scrambling process on data that should be transmitting to the relevant receiving side apparatus 3-1, 3-2, . . . or 3-m, generate optical signals for the relevant receiving side apparatus 3-1, 3-2, . . . or 3-m using at least one optical wavelength which can be converted into electric signals by the usable photoelectric converting units 7-1 through 7-p among the p photoelectric converting units 7-1 through 7-p and transmit the optical signals. On the other hand, the relevant receiving side apparatus 3-1, 3-2, . . . or 3-m may convert the optical signals of at least one wavelength among the filtered p optical signals having different wavelengths into electric signals, and perform a descrambling process on the converted electric signals to restore data addressed to itself.

When at least one of the photoelectric converting units 7-1 through 7-p becomes unusable in any one of the plural receiving side apparatus 3-1 through 3-m, the transmitting side apparatus 1 may perform scrambling processes unique to the respective receiving side apparatus 3-1 through 3-m on data that should be transmitted to all of the receiving side apparatus 3-1 through 3-m, generate optical signals using at least one optical wavelength different from one another according to each of the receiving side apparatus 3-1 through 3-m and transmit the optical signals. On the other hand, each of the receiving side apparatus 3-1 through 3-m may filter the above optical signals of at least one optical wavelength, and convert the filtered optical signals into electric signals by usable photoelectric converting units 7-1 through 7-p to restore data addressed to itself.

According to this invention, as described above, it is possible to generate optical signals for the respective plural opposite apparatus using a combination of p optical wavelengths set in advance for each of the plural opposite apparatus (optical receiving apparatus, receiving side apparatus) by the optical signal generating unit of the optical transmitting apparatus (transmitting side apparatus), and transmit wavelength division multiplexed optical signals from the wavelength division multiplexing transmitting unit over the optical communication network. It is therefore possible to configure an optical communicating system which can accommodate subscriber terminals m larger in number than wavelengths n which can be wavelength division multiplexed so as to efficiently use a transmission band of the optical communication system and increase extensibility of the network while keeping an existing performance of wavelength division multiplexing of the network.

Further, it is possible to set a combination of p wavelengths in advance for each of the plural opposite apparatus (optical receiving apparatus, receiving side apparatus) and transmit the signals. It is thereby possible to improve accuracy of communication while preventing transmit signals addressed to a certain opposite apparatus (optical receiving apparatus, receiving side apparatus) from being transmitted to another opposite apparatus (optical receiving apparatus, receiving side apparatus) so as to realize privacy protection, that is, improve communication security.

Further, it is possible to convert data including plural destinations transmit information without privacy that should be transmitted to a plurality of destinations along with private information that should be prevented from being received by an opposite apparatus other than the opposite apparatus (optical receiving apparatus, receiving side apparatus) which are destinations as optical signals. It is thereby possible to do wavelength division multiplexing transmission while selecting wavelengths according to characteristics of a data system that should be transmitted. In particular, it is possible to improve utility of the optical communication system so as to remarkably increase efficiency of a used band in a transmission route.

Hereinafter, description will be made of embodiments of the present invention with reference to the drawings.

(b) Description of a First Embodiment

Figure 2:
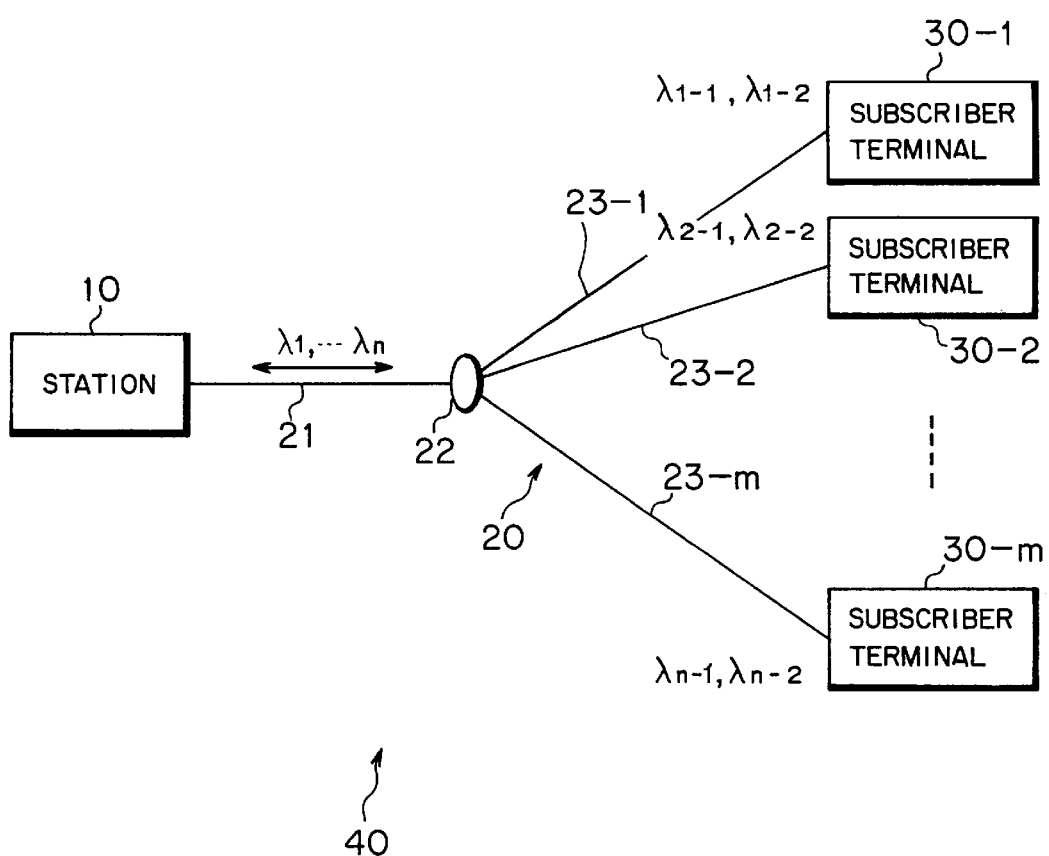
FIG. 2 is a block diagram showing an optical communicating system to which a first embodiment of this invention is applied.

FIG. 2 is a block diagram showing an optical communicating system to which a first embodiment of this invention is applied. In the optical communicating system 40 shown in FIG. 2, reference numeral 10 denotes a station (optical transmitting apparatus, transmitting side apparatus). The station 10 can convert transmit data, which is time division multiplexed (TDM) or in the synchronous transfer mode (STM), into wavelength division multiplexed optical signals and transmit the optical signals to the subscriber terminals (optical receiving apparatus, receiving side apparatus) 30-1 through 30-m (m; an integer not less than 2), which are a plurality of opposite apparatus as destinations over an optical communication network 20.

In the optical communication network 20, an optical fiber 21 on the side of the station 10 is connected to each of optical fibers 23-1 through 23-m on the side of the subscriber terminals via an optical coupler 22. Whereby, the station 10 can transmit an optical signal of, for example, n optical wavelengths as a wavelength division multiplexed optical signal through the optical fiber 21, whereas each of the subscriber terminals 30-1 through 30-m can receive a wavelength division multiplexed optical signal separated by the optical coupler 22 fed from the optical fiber 21 through each of the optical fibers 23-1 through 23-m.

In each of the subscriber terminals 30-1 through 30-m, two wavelengths, for example, are uniquely set in advance as wavelengths that should be used as receive signals (or transmit signals). Whereby, each of the subscriber terminals 30-1 through 30-m receives optical signals having the above two wavelengths, and regenerate receive data from the received optical signals of the above wavelengths.

In other words, a combination of the wavelengths used as receive signals (or transmit signals) in each of the subscriber terminals 30-1 through 30-m is so set as to differ from other combinations of n kinds of optical wavelengths that the optical communication network 20 according to the first embodiment can wavelength division mutliplex and transmit.

If arbitrary two wavelengths $\lambda$ i-1 and $\lambda$ i-2 among wavelengths $\lambda$ 1 through $\lambda$ 2 are assigned to a certain subscriber terminal 30-i (i; an arbitrary integer from 1 to m), for example, wavelengths $\lambda$ j-1 and $\lambda$ j-2 assigned to another subscriber j (j ; an arbitrary integer from 1 to m different from i) are a combination different from a combination of the wavelengths $\lambda$ i-1 and $\lambda$ i-2. Each of the subscriber can thereby prevent optical signals addressed to other subscribers from being received so as to realize privacy protection.

Incidentally, if the number of wavelengths that can be wavelength division multiplexed and transmitted in the optical communication network 20 is n (wavelengths $\lambda$ 1, $\lambda$ 2, . . . $\lambda$ n) and if a couple of optical wavelengths are set as wavelengths of transmit-receive signals in each of the subscriber terminals 30-1 through 30-$m$, a maximum number of the subscribers (subscriber terminals) are determined as follows.

Namely, a combination of two wavelengths λ i-1 and λ i-2 selected by a certain subscriber terminal 30-$i$ is as expressed by an equation (1) below, and the number of combinations [n(n−1)/2] corresponds to a maximum number of the subscribers m.

$$nC2=n(n-1)/2 \quad (1)$$

Figure 3:
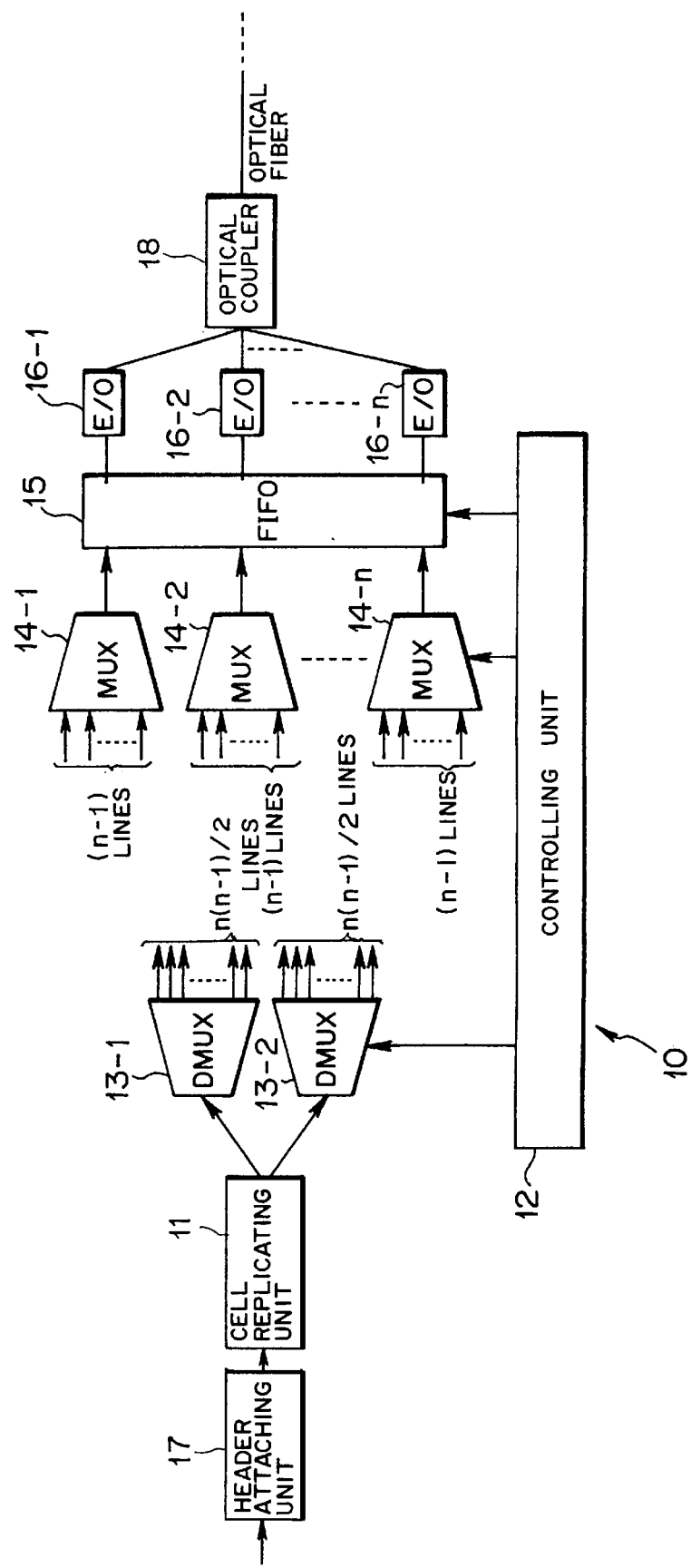
FIG. 3 is a block diagram showing a station according to the first embodiment of this invention.

Meanwhile, the above station 10 has, as shown in detail in FIG. 3, a header attaching unit 17, a cell replicating unit 11, a controlling unit 12, demultiplexing switch units (DMUX; Demultiplex) 13-1 and 13-2, multiplexing units (MUX; Multiplex) 14-1 through 14-$n$, an FIFO (First-in First-out) memory 15 and E/O (Electric/Optic) converting units 16-1 through 16-$n$.

Figure 4:
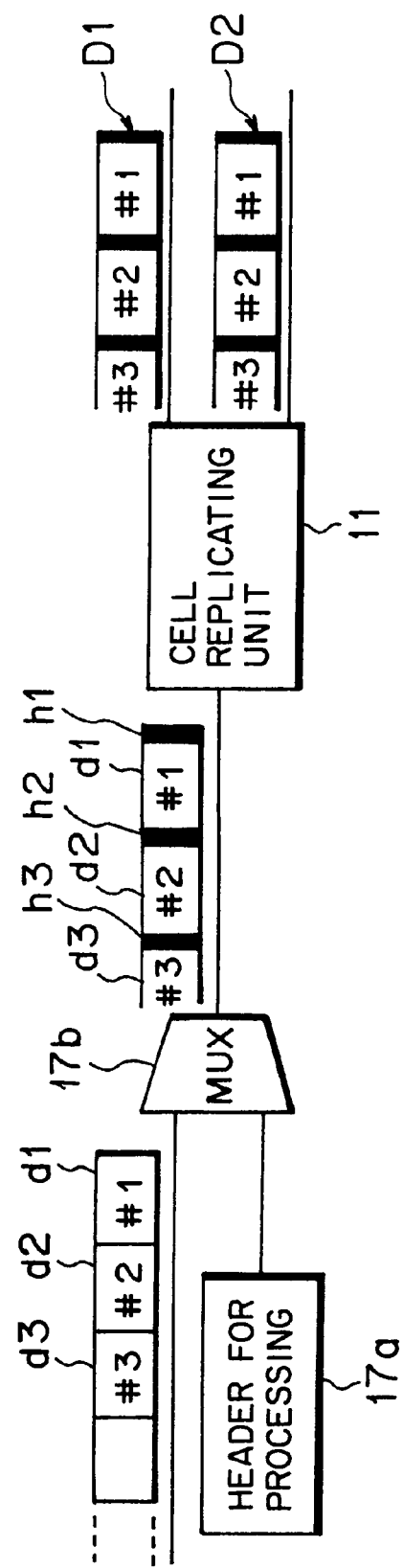
FIG. 4 is a block diagram showing a structure of an essential part of the station according to the first embodiment of this invention.

The header attaching unit 17 attaches header information including destination information to each cell (or packet or frame) configuring time division multiplexed data inputted as transmit data. The header attaching unit 17 has, as shown in detail in FIG. 4, a header information generating unit 17$a$ and a header inserting unit 17$b$.

The header information generating unit 17$a$ generates, as header information (header for processing), information according to a destination corresponding to each cell (refer to reference numerals d1 through d3) configuring the time division multiplexed data as transmit data. The header inserting unit 17$b$ inserts the corresponding header information (refer to reference numerals h1 through h3) into a head portion of each cell configuring the above time division multiplexed data.

The cell replicating unit 11 replicates (copies) the time division multiplexed data to which the header information is attached by the header attaching unit 17, and outputs it as identical two time division multiplexed data (refer to reference numeral D1 and D2 in FIG. 4), the cell replicating unit 11 functioning as a data replicating unit.

The controlling unit 12 refers to a table 12$a$ shown in FIG. 8, which will be described later, from the header information attached by the above header attaching unit 17 to perform a routing control on the demultiplexing switch units 13-1 and 13-2 and the multiplexing units (MUXs) 14-1 through 14-$n$ on the basis of the table information, besides adjusting a timing of signals to be outputted from the FIFO memory 15. The controlling unit 12 is mainly configured with a processor, a memory, etc.

Figure 5:
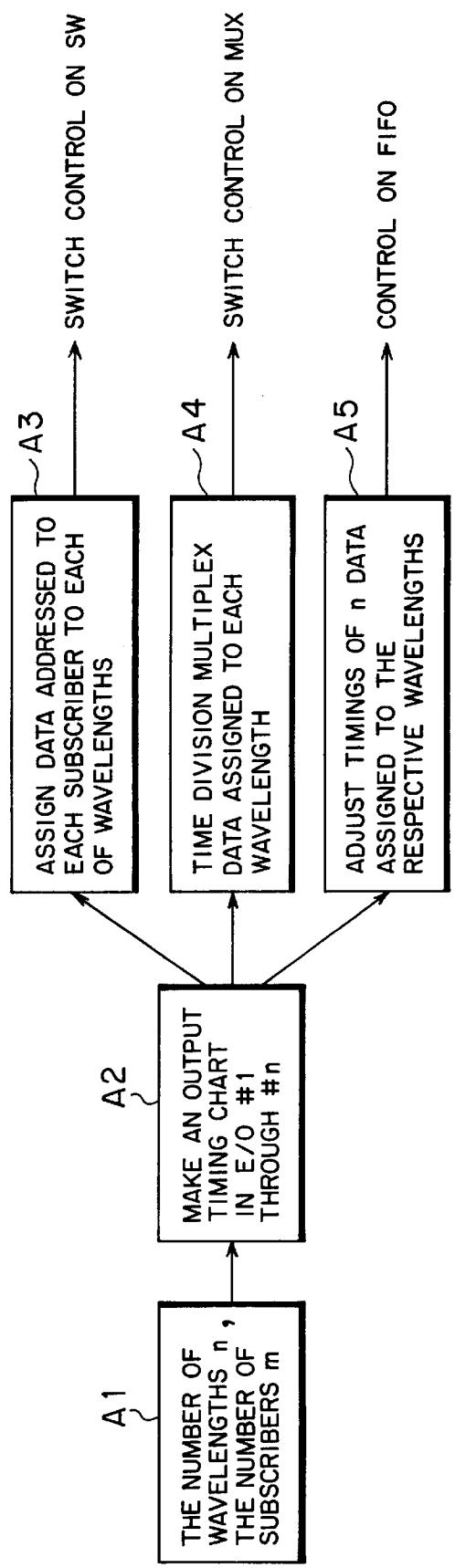
FIG. 5 is a diagram for illustrating a control mode of a controlling unit in the station according to the first embodiment of this invention.

As shown in FIG. 5, on the basis of information about the number of times of wavelength division multiplexing n and the number of subscribers m determined by a network structure in the first stage of the operation (Step A1), the controlling unit 12 makes time division multiplexing transmit timings (transmit timings of data addressed to the subscriber terminals 30-1 through 30-$m$) of the E/O converting units 16-1 through 16-$n$ (Step A2).

In other words, the controlling unit 12 can control the demultiplexing switch units 13-1 and 13-2, the multiplexing units 14-1 through 14-$n$ and the FIFO memory 15, as will be described later, on the basis of the timing information made as above (Step A3 through A5)

If plural sorts of combinations are derived from the above information about the number of times of wavelength division multiplexing n and the number of subscribers m determined by the network structure, the above time division multiplexing transmit timings are appropriately selected among the combinations and made.

For example, if the number of times of wavelength division multiplexing is "6" and the number of wavelengths set to each subscriber is "2", a value of combinations which can be selected as wavelengths of optical signals received by the subscribers 30-1 through 30-$m$ is "15" as shown by an equation 2 below, and "15" corresponds to a maximum number of the subscribers (=m).

$$6C2=6 \; 5/2=15 \quad (2)$$

In this case, as shown in FIG. 6($b$), cells configuring transmit signals to be transmitted to the subscriber terminals 30-1 through 30-3 are transmitted at the first timing t1 using two optical signals having different wavelengths, after that, transmit cells to be transmitted to the subscriber terminals 30-4 through 30-6, the subscriber terminals 30-7 through 30-9, the subscriber terminals 30-10 through 30-12 and the subscriber terminal 30-13 through 30-15 are successively transmitted using two optical signals having different wavelengths [refer to times t2 through t5 in FIG. 6($b$)]. Namely if the number of times of wavelength division multiplexing is even, it is possible to assign data for each of all subscribers to the same one time slot.

On the other hand, if the number of times of wavelength division multiplexing is "5", a value of combinations N which can be selected as wavelengths of optical signals received by the subscriber terminals 30-1 through 30-$m$ is "10" as shown by an equation (3) below, so that a maximum number of subscribers m is "10".

$$5C2=5 \; 4/2=10 \quad (3)$$

In this case (where the number of times of wavelength division multiplexing n is odd), data for certain subscribers of all subscribers is not assigned to the same time slot.

For example, as shown in FIG. 6($a$), two optical signals having different wavelengths as transmit cells to be transmitted to each of the eight subscriber terminals 30-1, 30-2, 30-4, 30-5, 30-6, 30-7, 30-9 and 30-10 are assigned to the same time slot, while two optical signals having different wavelength to be transmitted to each of the subscriber terminals 30-3 and 30-8 are assigned to time slots whose timings are shifted one time slot.

Incidentally, in FIGS. 6($a$) and 6($b$), reference numerals labeled to transmit cells of respective wavelengths arranged in time series show subscribers terminals which are destinations of the transmit cells.

The above controlling unit 12 can have a table 12$a$ which holds information of the order of outputting transmit cells to be transmitted to the subscribers 30-1 through 30-$m$ in a table structure, along with information about the multiplexing units 14-1 through 14-$n$ which are destinations of switching of the demultiplexing switch units 13-1 and 13-2, correspondingly to the header information ("0100100", for example) showing destinations attached by the header attaching unit 17.

Each of the demultiplexing switch units 13-1 and 13-2 shown in FIG. 3 demultiplexes a transmit signal as time division multiplexed data inputted from the cell replicating unit 11 into transmit cells for the respective subscriber terminals 30-1 through 30-$m$ which are destinations under a control of the controlling unit 12, switches the demultiplexed transmit cells so that each of the demultiplexed transmit cells is converted into an optical signal of a desired wavelength, and outputs the optical signals to the multiplexing units 14-1 through 14-$n$ in the following stage.

In other words, each of the demultiplexing switching units 13-1 and 13-2 receives data of one input, and outputs demultiplexed data from m (=nC2) outputs (corresponding to the number of subscribers). The outputs from each of the demultiplexing switches 13-1 and 13-2 are inputted to the respective n multiplexing units 14-1 through 14-n in the following stage.

The transmit cells from the demultiplexing switch unit 13-1 and the transmit cells from the separating switch 13-2 are so set that a combination of the multiplexing units 14-1 through 14-n to which the transmit cells are outputted for respective destinations is different from one another. Whereby, the transmit cells are converted into two optical signals having different wavelengths for each destination as will be described later. A combination of wavelengths of the two optical signals are so set as to be different from one another according to a destination.

Figure 7:
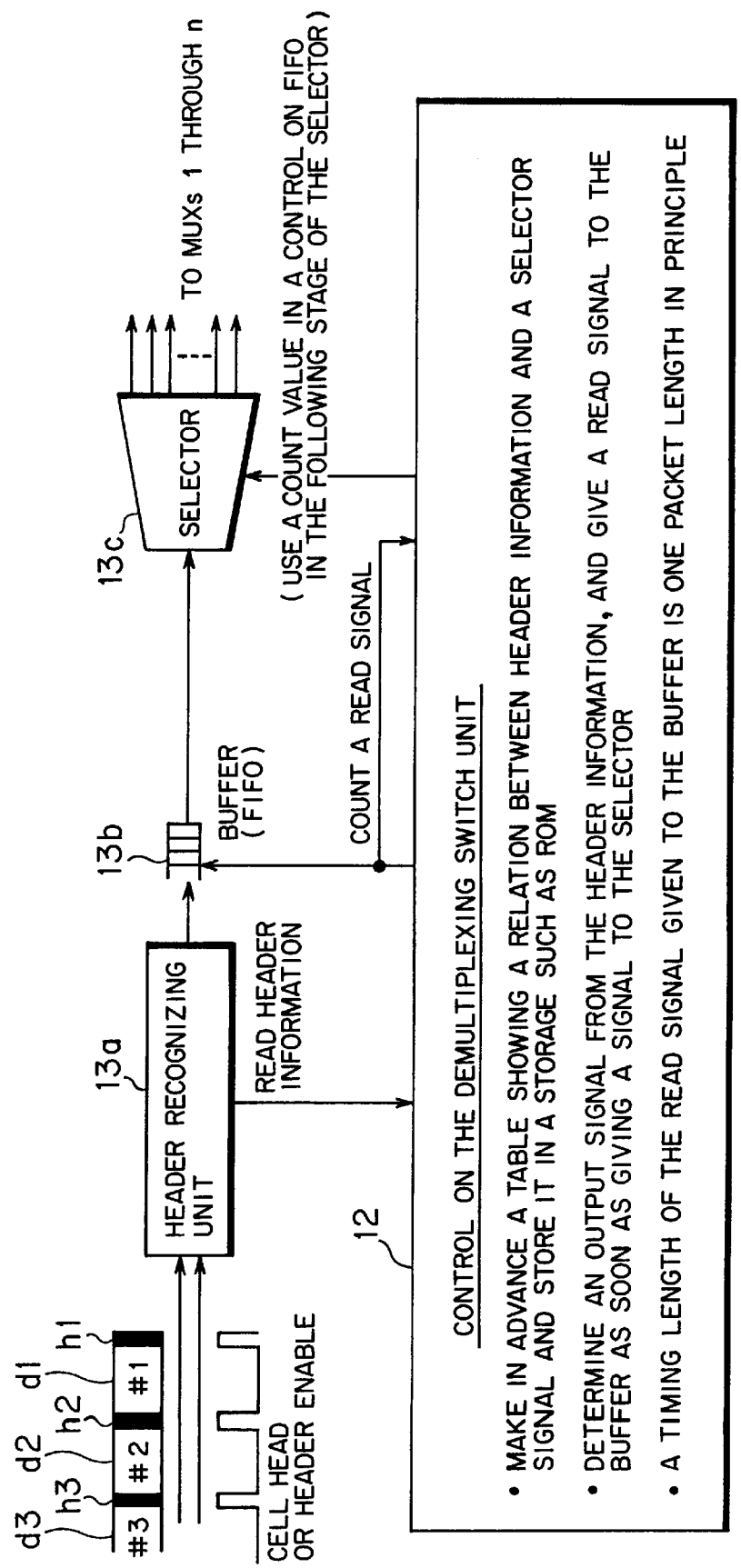
FIG. 7 is a block diagram showing a structure of an essential part of the station according to the first embodiment.

Accordingly, the demultiplexing switch units 13-1 and 13-2 function as a data demultiplexing unit for time division demultiplexing two replicated data replicated by the cell replicating unit 11 into data addressed to the respective subscriber terminals 30-1 through 30-m. Each of the separating switch units 13-1 and 13-2 has, as shown in detail in FIG. 7, a header recognizing unit 13a, a buffer 13b and a selector 13c.

The header recognizing unit 13a is inputted a cell leading pulse or header enable information from the header attaching unit 17 along with either one of the two time division multiplexed data (refer to reference numerals D1 and D2 in FIG. 4) replicated by the cell replicating unit 11 to read out and recognize header information h1 through h3 attached to respective transmit cells d1 through d3. A result of the recognition is notified to the controlling unit 12.

When receiving the above result of the recognition, the controlling unit 12 controls the selector 13c, which will be described later, on the basis of optical wavelength information used as receive signals by the destination subscriber terminals 30-1 through 30-m, by referring to the above table 12a, thereby performing a routing control on signals in the demultiplexing switching units 13-1 and 13-2.

The buffer 13b holds data whose header is recognized by the header recognizing unit 13a, and outputs the data to the following stage on the basis of clock signals inputted at intervals of one cell length (or one packet length, or a one frame length). The buffer 13b is configured with an FIFO memory or the like. In other words, the buffer 13b adjusts an output timing of cell data inputted from the header recognizing unit 13a.

The selector 13c receives a control signal based on the table 12a from the controlling unit 12 to switch a transmit cell inputted from the buffer 13b so that the transmit cell is converted into an optical signal of a wavelength according to the information of a destination subscriber terminal 30-1, 30-2, . . . or 30-m shown by the header information of the inputted cell.

Figures 9A, 9B:
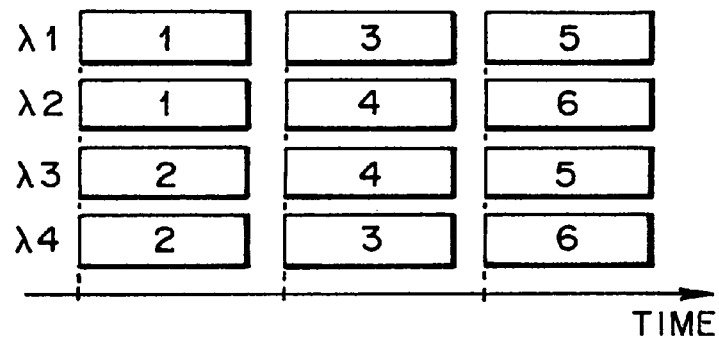

In concrete, if the number of times of wavelength division multiplexing is "4" (used wavelengths are λ 1 through λ 4), the number of subscribers is "6" (assuming that user IDs assigned to the subscriber terminals 30-1 through 30-6 are "1" through "6" ) and transmit cells are outputted to the subscriber terminals in the order shown in FIG. 9(a), the controlling unit 12 controls switching of the selectors 13c of the demultiplexing switch units 13-1 and 13-2 by referring to a table 12a' as shown in FIG. 9(b).

In this case, the selector 13c of the demultiplexing switch unit 13-1 so switches data addressed to, for example, the subscriber terminal 30-1 (whose user ID is "1") under the control of the controlling unit 12 that the data is outputted to the multiplexing unit 14-1, whereas the selector 13c of the demultiplexing switch unit 13-2 so switches the data that the data is outputted to the multiplexing unit 14-2. Data addressed to the other subscriber terminals 30-2 through 30-6 are switched under the control of the controlling unit 12 on the basis of contents of the table 12a', similarly to the above case.

The multiplexing unit 14-k (k; an integer from 1 to n) multiplexes the transmit cells switched by the demultiplexing switch units 13-1 and 13-2 and outputs the transmit cells in order to convert the transmit cells into optical signals according to a wavelength of a destination and in the transmitting order set in advance. Namely, data multiplexed by the multiplexing unit 14-k is converted into optical signals in the corresponding E/O converting unit 16-k.

Accordingly, the multiplexing units 14-1 through 14-n function as a plurality of multiplexing units each for multiplexing data demultiplexed by the demultiplexing switch units 13-1 and 13-2 and to be converted into an optical signal having a wavelength according to a destination.

Figure 10:
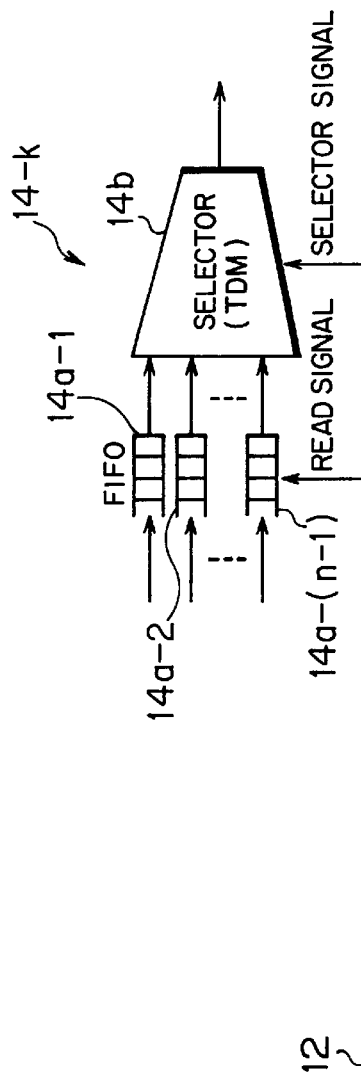
FIG. 10 is a block diagram showing an essential part of the station according to the first embodiment of this invention.

The multiplexing unit 14-k has, as shown in detail in FIG. 10, (n−1) buffers 14a-1 through 14a-(n−1) and a selector 14b.

Each of the (n−1) buffers 14a-1 through 14a-(n−1) is inputted one transmit cell among m signals demultiplexed by the demultiplexing switch unit 13-1 (or the demultiplexing switch unit 13-2) to hold the transmit cell until a predetermined number (one, for example) of cells are accumulated in all of the other buffers 14a-1 through 14a-(n−1) (in its own multiplexing unit 14-k), which can be configured with, for example, an FIFO memory.

In concrete, the controlling unit 12 counts read signals to the FIFO memories in the preceding stage (the buffers 13b of the separating switch units 13-1 and 13-2, for example), and counts the number of the transmit cells accumulated in each of the buffers 14a-1 through 14a-(n−1) on the basis of the count value of the read signals.

When a predetermined number of the transmit cells are accumulated in all the buffers 14a-1 through 14a-(n−1), the controlling unit 12 outputs a read signal to each of the buffers 14a-1 through 14a(n−1).

The selector 14b receives a control signal from the controlling unit 12 to output the accumulated transmit cells according to transmit cell outputting order information registered in the above-mentioned table 12a when a predetermined number of the transmit cells are accumulated in the buffers 14-1 through 14-(n−1) in all the multiplexing units 14-1 through 14-n.

Figure 11:
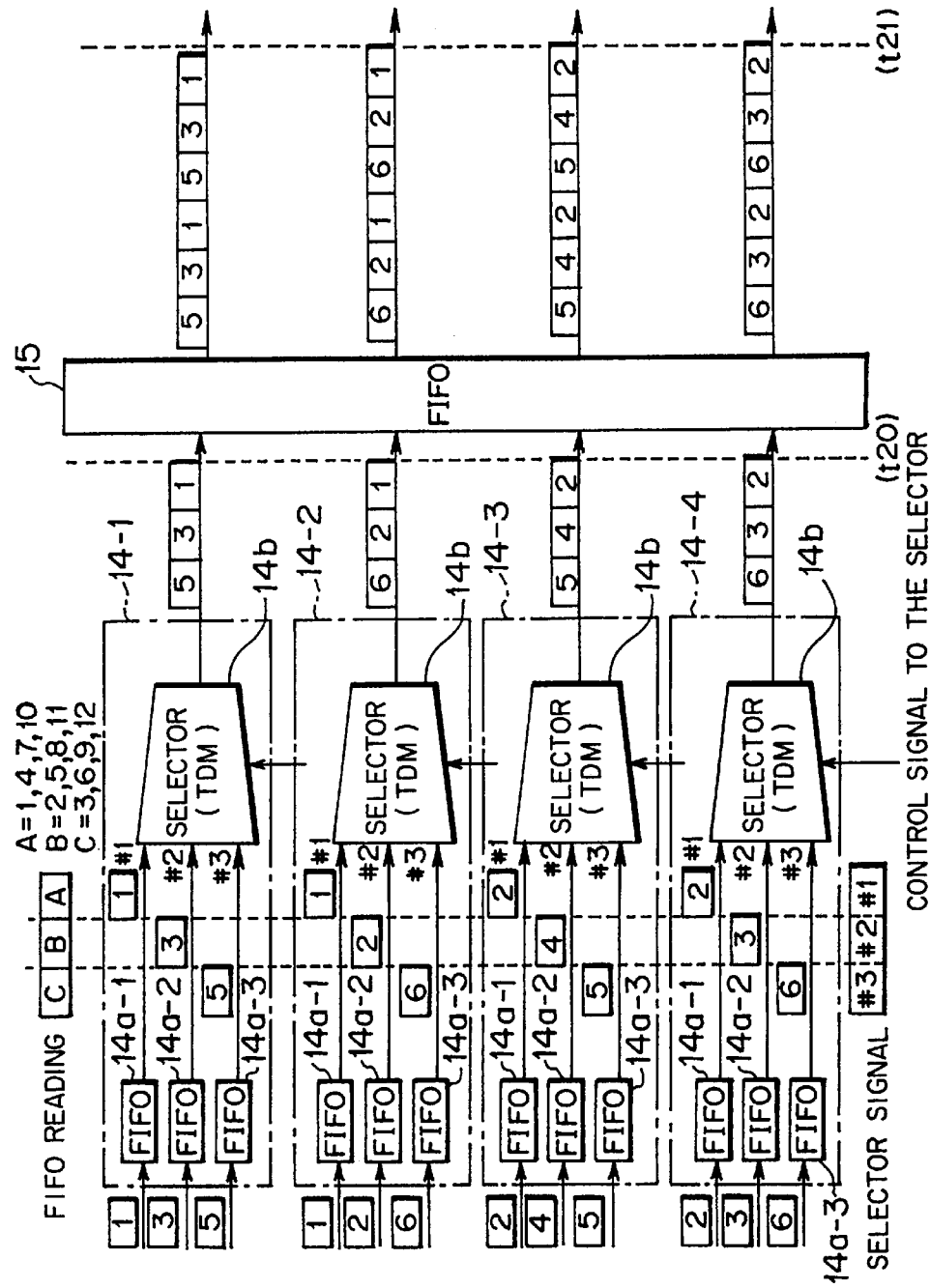
FIG. 11 is a diagram f or illustrating an operation of the station according to the first embodiment.

If the number of times of wavelength division multiplexing n is "4", the number of subscribers is "6" similarly to the example shown in FIGS. 9(a) and 9(b), and the transmit cells are outputted to each of the subscriber terminals in the order shown in FIG. 9(a), the transmit cells are inputted to the multiplexing units 14-1 through 14-4 as shown in FIG. 11, for example, and multiplexed and outputted to the FIFO memory 15 in the following stage.

Namely, the transmit cells from the demultiplexing switch unit 13-1 (or the demultiplexing switch unit 13-2) addressed to the three subscriber terminals 30-1, 30-3 and 30-5 are inputted to the multiplexing unit 14-1. Among which, a transmit cell addresses to the subscriber terminal 30-1 is accumulated in the buffer 14a-1, a transmit cell addressed to the subscriber terminal 30-3 is accumulated in the buffer 14a-2, and the transmit cell addressed to the subscriber terminal 30-5 is accumulated in the buffer 14a-3.

Similarly, the transmit cells addressed to the subscriber terminals 30-1, 30-2 and 30-6 are accumulated in the respective buffers 14a-1 through 14a-3 of the multiplexing unit 14-2. The transmit cells addressed to the subscriber terminals 30-2, 30-4 and 30-5 are accumulated in the respective buffers 14a-1 through 14a-3 of the multiplexing unit 14-3. The transmit cells addressed to the subscriber terminals 30-2, 30-3 and 30-6 are accumulated in the respective buffers 14a-1 through 14a-3 of the multiplexing unit 14-4.

The controlling unit 12 refers to the table 12a on the basis of results of header recognition fed from the header recognizing units 13a in the demultiplexing switch units 13-1 and 13-2 in the preceding stage, thereby generating a control signal for each of the selectors 14b. Accordingly, the controlling unit 12 can control the order of outputting data accumulated in the buffers 14a-1 through 14a-3 to the FIFO memory 15.

When a predetermined number (one, for example) of the transmit cells are accumulated in each of the buffers 14a-1 through 14a-3 in the preceding stage, the selectors 14b of the multiplexing units 14-1 through 14-4 collectively transmit data accumulated in the buffers 14a-1, data accumulated in the buffers 14a-2, and data accumulated in the buffers 14a-3 in succession.

In concrete, transmit data addressed to the subscriber terminals 30-1, 30-3 and 30-5 is successively transmitted from the selector 14b of the multiplexing unit 14-1, and transmit data addressed to the subscriber terminals 30-1, 30-2 and 30-6 is successively transmitted from the selector 14b of the multiplexing unit 14-2.

Similarly, transmit data addressed to the subscriber terminals 30-2, 30-4 and 30-5 is successively transmitted from the selector 14b of the multiplexing unit 14-3, and transmit data addressed to the subscriber terminals 30-2, 30-3 and 30-6 is successively transmitted from the selector 14b of the multiplexing unit 14-4.

A transmit timing of data outputted from each of the multiplexing units 14-1 through 14-4 is synchronized with the control signal for the selectors 14b configuring the respective multiplexing units 14-1 through 14-4 (refer to a time t20 in FIG. 11).

The FIFO memory 15 shown in FIG. 3 adjusts an input timing of transmit signals outputted from the above multiplexing units 14-1 through 14-n to the E/O converting units 16-1 through 16-n. In other words, the FIFO memory 15 is inputted output signals from the multiplexing units 14-1 through 14-n, and fills up an idle bit and synchronizes an output timing so as to output the signals to the E/O converting units 16-1 through 16-n.

For example, when inputted multiplexed signals from the multiplexing units 14-1 through 14-4 as shown in FIG. 11, the FIFO memory 15 can synchronize a timing of the data and output the signals to the respective E/O converting units 16-1 through 16-4 (refer to a time t21).

By means of the header attaching unit 17, the cell replicating unit 11, the demultiplexing switch units 13-1 and 13-2, the multiplexing units 14-1 through 14-n and the FIFO memory 15, it is possible to generate time division multiplexed transmit data having a redundant structure addressed to the subscriber terminals 30-1 through 30-m.

The E/O converting units 16-1 through 16-n convert the time division multiplexed transmit data [(n−1) transmit cells, for example] having the redundant structure fed from the FIFO memory 15 from electric signals into optical signals having different wavelengths ($\lambda$ 1 through $\lambda$ n), which have a function as an optical converting unit.

Accordingly, the control unit 12, the multiplexing unit 14-1 through 14-n, the FIFO memory 15 and the E/O converting units 16-1 through 16-n mentioned above function as a signal converting unit for converting data demultiplexed by the demultiplexing switch units 13-1 and 13-2 into optical signals having p optical wavelengths such set in advance that a combination of the optical wavelengths is different from one another according to the subscriber terminal 30-1, 30-2, . . . or 30-m, which is a destination, and outputting the optical signals.

In other words, the header attaching unit 17, the cell replicating unit 11, the controlling unit 12, the demultiplexing switch units 13-1 and 13-2, the multiplexing units 14-1 through 14-n, the FIFO memory 15 and the E/O converting units 16-1 through 16-n mentioned above function as an optical signal generating unit for generating optical signals for the respective plural subscriber terminals 30-1 through 30-m by using a combination of two optical wavelengths set in advance for each of the plural subscriber terminals 30-1 through 30-m.

The optical coupler 18 couples optical signals having different wavelengths ($\lambda$ 1 through $\lambda$ n) from the E/O converting units 16-1 through 16-n. Wavelength division multiplexed signals as the coupled optical signals are transmitted to the subscriber terminals 30-1 through 30-m on the receiving side over the optical communicating network 20. Accordingly, the optical coupler 18 has a function as a wavelength division multiplexing transmitting unit for wavelength division multiplexing optical signals generated by the E/O converting units 16-1 through 16-n and transmitting the optical signals.

Figure 12:
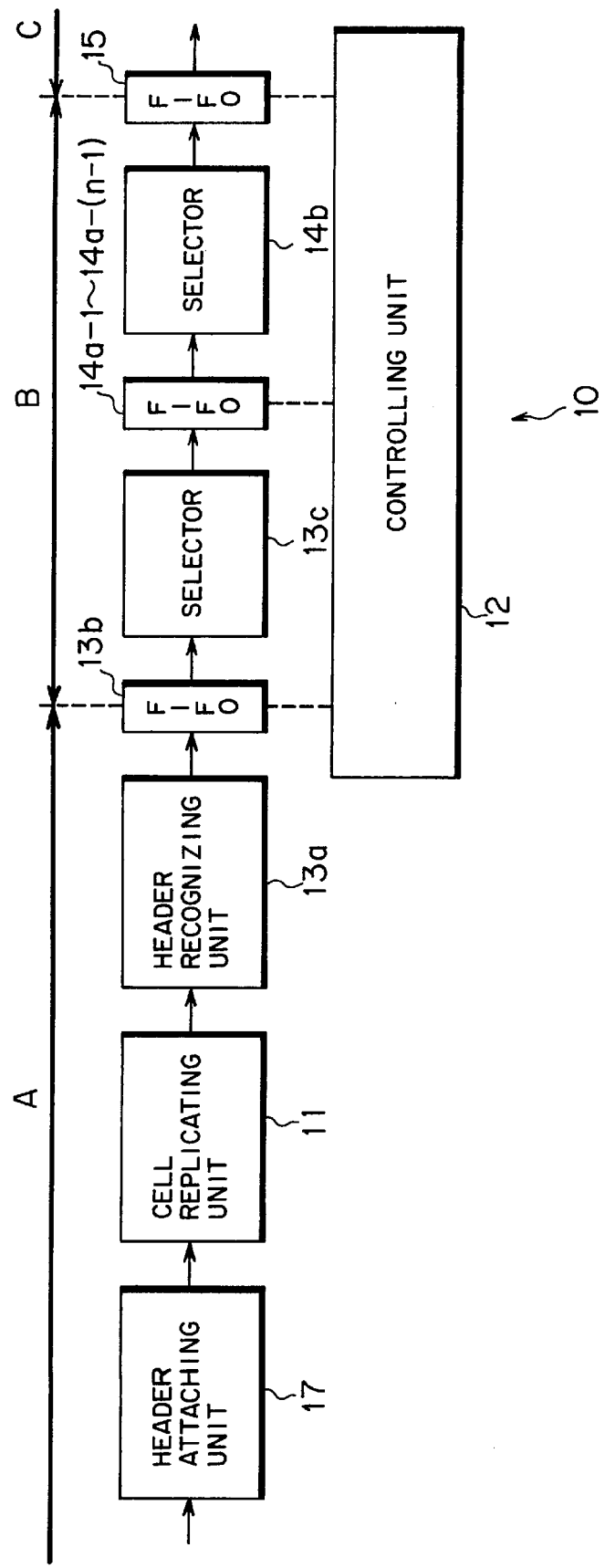
FIG. 12 is a diagram for illustrating setting of operation clocks in the station according to the first embodiment of this invention.

As shown in FIG. 12, the header attaching unit 17, the cell replicating unit 11 and the header recognizing unit 13a (refer to a region indicated by an arrow denoted by a reference numeral A) comprising the station 10 operate in synchronization with a concurrent clock of input data. Reading operations of the buffers 13b, and 14a-1 through 14a-(n−1) as the FIFO memory and operations of the selectors 13c and 14b (refer to a region indicated by an arrow denoted by a reference numeral B) are synchronized with peculiar clocks of the controlling unit 12. The FIFO memory 15 (refer to a region indicated by an arrow denoted by a reference numeral C) is read out in synchronization with a clock of an optical module from the controlling unit 12.

Figure 13:
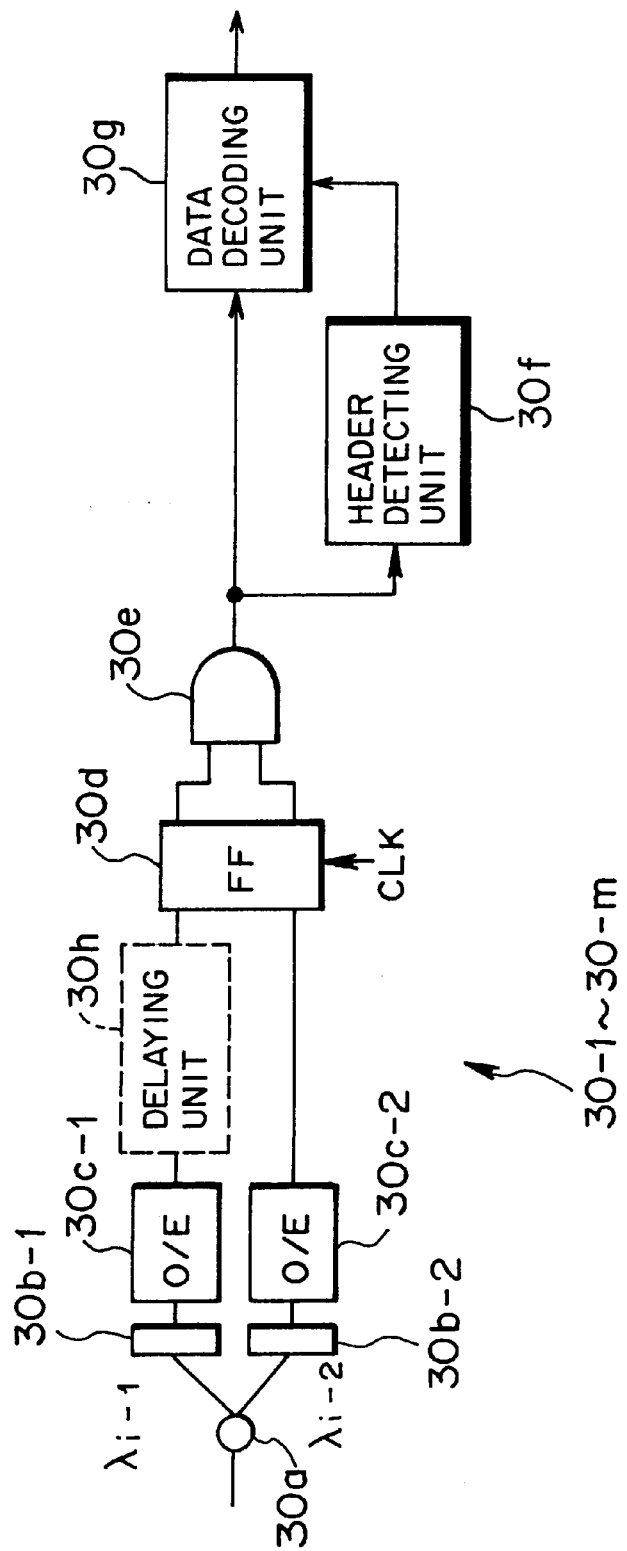
FIG. 13 is a block diagram showing a subscriber terminal according to the first embodiment of this invention.

Each of the subscriber terminals 30-1 through 30-m receives wavelength division multiplexed optical signals from the station 10 over the optical communication network 20 as stated above, and regenerate receive data from the two optical signal having predetermined different wavelengths set in advance configuring the wavelength division multiplexed optical signals, which has a structure as shown in detail in FIG. 13.

Each of the subscriber terminals 30-1 through 30-m has, as shown in FIG. 13, an optical coupler 30a, wavelength filtering units 30b-1 and 30b-2, O/E (Optic/Electric) converting units 30c-1 and 30c-2, a flip-flop (FF) 30d, an AND circuit 30e, a header detecting unit 30f and a data decoding unit 30g.

The optical coupler 30a receives a wavelength division multiplexed optical signal from the station 10 over the optical communication network 20 to branch the power of the signal into two optical signals. The wavelength filtering units 30b-1 and 30b-2 filter optical signals having two wavelengths ($\lambda$ i-1, $\lambda$ i-2) used as receive signals set in advance for each of the subscriber terminals 30-1 through 30-m.

For example, if wavelengths $\lambda$ 1 and $\lambda$ 2 are set as receive optical signal wavelengths in the subscriber terminal 30-1, the wavelength filtering unit 30b-1 of the subscriber terminal 30-1 filters an optical signal of a wavelength $\lambda$ 1, whereas the wavelength filtering unit 30b-1 of the subscriber terminal 30-2 filters an optical signal of a wavelength $\lambda$ 2.

The E/O converting unit (photoelectric converting unit) 30c-1 receives an optical signal of a first predetermined wavelength filtered by the wavelength filtering unit 30b-1 to convert the optical signal into an electric signal. The E/O converting unit 30c-2 receives an optical signal of a second predetermined wavelength filtered by the wavelength filtering unit 30b-2 to convert the optical signal into an electric signal (digital signal).

The flip-flop 30d simultaneously outputs the receive signals converted into the electric signals by the O/E converting units 30c-1 and 30c-2 in synchronization with a clock signal to the AND circuit 16. If accuracy of synchronization of the receive signals converted into the electric signals by the O/E converting units 30c-1 and 30c-2 is sufficiently high, it is possible to omit the flip-flop 30d.

The AND circuit 30e performs an AND operation on the two receive signals simultaneously inputted from the flip-flop 30d. The header detecting unit 30f detects a lead portion (header) configuring a receive cell (or frame) from an output signal from the AND circuit 30e. The data decoding unit 30g decodes the receive cell from the lead portion when the header detecting unit 30f detects the lead portion of the receive cell to regenerate receive data.

A result of the AND operation performed by the AND circuit 30e is used when the data is regenerated by the header detecting unit 30f and the data decoding unit 30g. Therefore, when each of the subscriber terminal 30-1 through 30-m as an optical receiving apparatus (receiving side apparatus) regenerates receive data, a condition of regeneration is that the station 10 simultaneously transmits transmit signals addressed to the terminal of its own using two wavelengths.

Namely, even if an optical signal addressed to another terminal is included in either one of receive optical wavelengths, it is possible to prevent a receive signal addressed to another subscriber from being regenerated when the optical signal addressed to another terminal does not match with a receive signal of the other optical wavelength, so that security (that is, privacy protection) between the terminals can be secured at the time of receive signal regeneration.

The above subscriber terminals 30-1 through 30-m shown in FIG. 13 have a structure in the case where the station 10 can simultaneously receive optical signals of two wavelengths. If the subscriber terminal 303 shown in FIG. 6(a) cannot simultaneously receive two wavelengths λ 1 and λ 5 as stated before, the subscriber terminal 30-3 may have a delaying unit 30h in a following stage of the O/E converting unit 30c-1, for example.

The delaying unit 30h delays a timing of outputting to the flip-flop 30d an electric signal (digital signal) obtained as a result of conversion of an optical signal of a wavelength λ 5 filtered by the O/E converting unit 30c-1 at a timing before an optical signal of a wavelength 1 filtered by the O/E converting unit 30c-2 a predetermined time (one time slot, for example).

Whereby, the flip-flop 30d is simultaneously inputted two electric signals obtained as a result of conversion of the optical signals of wavelengths λ 1 and λ 5 received at different timings, and outputs the two electric signals (digital signals) in synchronization to the AND circuit 30e.

Namely, even if each of the subscriber terminals 30-1 through 30-m receives two optical signal of different wavelengths at different timings, it is possible to absorb a delay in receive timing by the delaying unit 30h. Therefore, the header detecting unit 30f and the data decoding unit 30g in the following stages can regenerate only receive data addressed to their own apparatus.

Next, an operation of the optical communication system with the above structure according to the first embodiment will be described.

When the station 10 transmits wavelength division multiplexed optical signals to a plurality of the subscriber terminals 30-1 through 30-m over the optical communication network 20, the station 10 generates optical signals for each of the subscriber terminals 30-1 through 30-m on the basis of a combination of two optical wavelengths set in advance for each of the plural terminals 30-1 through 30-m, wavelength division multiplexes the generated optical signals, and transmits the optical signals.

At this time, two sorts of optical signals transmitted to each of the subscriber terminals 30-1 through 30-m have different wavelengths. If the number of times of wavelength division multiplexing of optical wavelengths which can be transmitted over the optical communication network 20 is even, the same transmit data (replicated transmit data) addressed to the same subscriber terminal is converted in the same time slot of the optical signals. If the number of times of the wavelength division multiplexing is odd, the transmit data addressed to the same subscriber may be converted in different time slots.

In each of the above subscriber terminals 30-1 through 30-m, the wavelength filtering units 30b-1 and 30b-2 filter two optical signals having different wavelengths uniquely set in advance among wavelength division multiplexed optical signals transmitted from the station 10 over the optical communication network 20, then the two O/E converting units 30c-1 and 30c-2 convert the above two filtered optical signals having different wavelengths into electric signals, whereby each of the subscriber terminals 301 through 30-m restores data addresses to itself on the basis of the above converted electric signals.

Even if an optical signal addressed to another terminal is included in either one of the received optical wavelengths, it is possible to prevent a receive signal addressed to another terminal from being regenerated when it is found from a result of the operation performed by the AND circuit 30e that the receive signal does not match with a receive signal of the other wavelength. Therefore, it is possible to secure security (privacy protection) between the terminals when the receive data is regenerated.

In other words, since the time slots have been already synchronized in a stage of optical signal reception in each of the subscriber terminals 30-1 through 30-m, in addition, the bits are synchronized by the flip-flop 15, it is only a relevant subscriber into which data comes from both of transmission routes of two systems (wavelengths). Therefore, only the data addressed to this subscriber is restored by calculating an AND (logical product) so that privacy protection can be realized.

According to the first embodiment of this invention, when the station 10 transmits wavelength division multiplexed optical signals to the subscriber terminals 30-1 through 30-m over the optical communication network 20, the station 10 generates optical signals for each of the above plural subscriber terminals 30-1 through 30-m on the basis of a combination of two optical wavelengths set in advance for each of the plural subscriber terminals 30-1 through 30-m, and wavelength division multiplexes the above generated optical signals to transmit the same. It is therefore possible to configure a system which can accommodate subscriber terminals m [=n (n−1)/2] larger in number than wavelengths n which can be wavelength division multiplexed and transmitted. As a result, it is possible to efficiently use a transmission band of an optical communicating system and increase extensibility of the network while keeping an existing wavelength division multiplexing transmission performance of the network.

Further, it is possible to set in advance a combination of two optical wavelengths for each of the plural subscriber terminals 30-1 through 30-$m$ to transmit signals. It is therefore possible to improve an accuracy of communication while preventing a transmit signal addressed to a certain subscriber terminal 30-$i$ from being transmitted to another subscriber terminal 30-$j$ so as to realize privacy protection, that is, improve communication security.

(b1) Description of a Modification of the First Embodiment

According to the above first embodiment, there are uniquely set in advance two wavelengths as wavelengths to be used as receive signals (or transmit signals) in each of the subscriber terminals 30-1 through 30-$m$. However, the present invention is not limited to the above example. It is alternatively possible to uniquely combine a plurality of wavelengths not less than two to set them. In such case, the same advantage as the above first embodiment can be provided. In addition, it is possible to increase the number of subscribers in the optical communication network 20 under the same condition, as compared with the case where two optical wavelengths are set. Moreover, it is possible to realize improvement in accuracy of privacy protection in each of the subscriber terminals.

In the above case, it is possible to configure the station 10 and each of the subscriber terminals 30-1 through 30-$m$ similarly to the above case where two wavelengths are set.

According to the above first embodiment, the same number of wavelengths are assigned to each of the subscribers. However, it is alternatively possible to set a different number of wavelengths to be assigned to each of the subscribers (on the assumption that not less than two wavelengths are set).

According to the above first embodiment, there are set two sorts of wavelengths to be used as receive signals (or transmit signals) in each of the subscriber terminals 30-1 through 30-$m$, without dependency on the order of receiving (or transmitting). The present invention is not limited to the above example. It is alternatively possible to attach dependency to the order of transmitting/receiving the optical signals at the time of setting the two wavelengths.

In other words, each of the E/O converting unit 16-1 through 16-$n$ can be so configured as to attach dependency to the order of optical wavelengths to be converted into optical signals when converting multiplexed data into two optical signals.

In concrete, only when a certain subscriber terminal 30-$i$ receives first an optical signal of a wavelength $\lambda$ i, and receives secondary an optical signal of a wavelength $\lambda$ j between two optical signals having the wavelengths $\lambda$ i and $\lambda$ j, the subscriber terminal 30-$i$ can regenerate receive data. On the other hand, only when another subscriber 30-$j$ receives first the optical signal of a wavelength $\lambda$ i, and receives secondary the optical signal of a wavelength $\lambda$ j, the subscriber terminal 30-$j$ can regenerate receive data. As this, it is possible to set wavelengths of optical signals for the respective subscriber terminals 30-$i$ and 30-$j$ with a couple of wavelengths $\lambda$ i and $\lambda$ j.

Figures 14A, 14B:
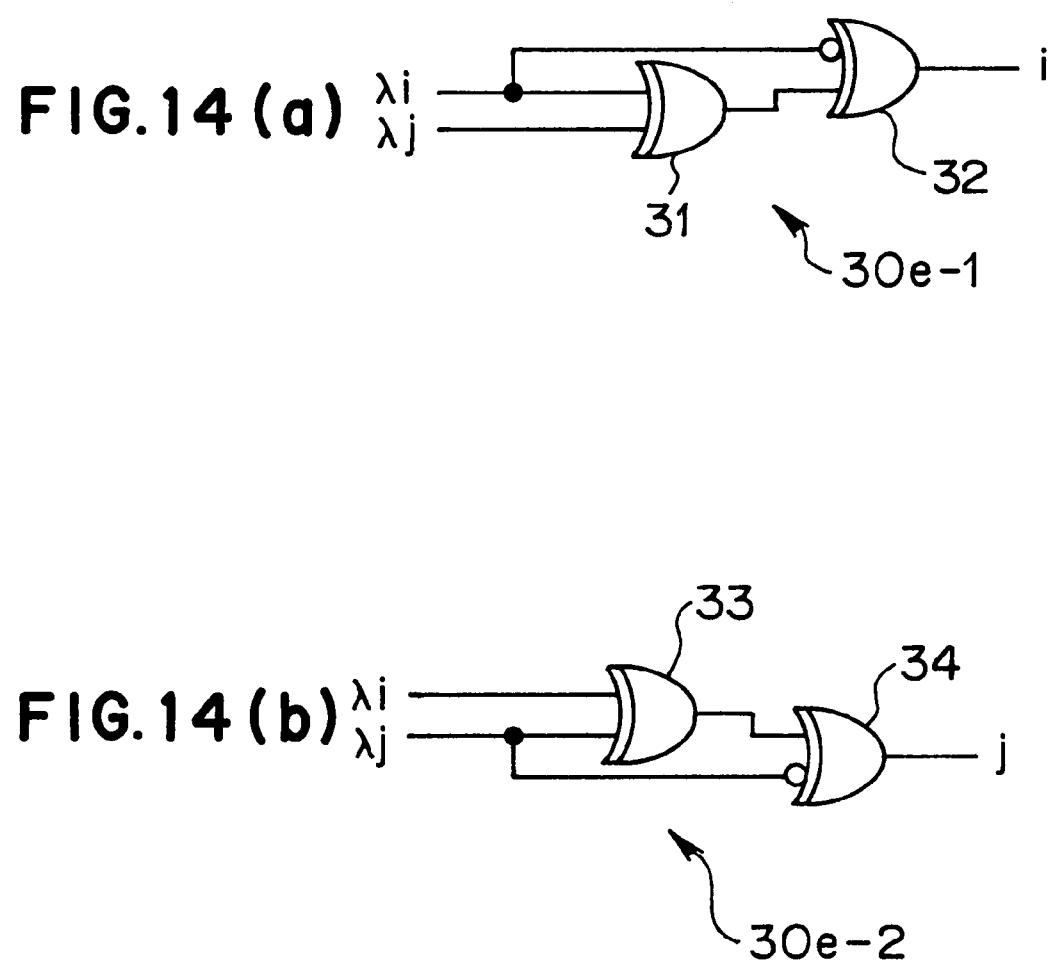

In this case, the station 10 shifts a timing of converting transmit cells demultiplexed by the demultiplexing switch unit 13 into optical signals by the E/O converting units 16-1 through 16-$n$ in the following stage on the basis of destination information and wavelength information of an optical signal to be converted according to the destination. On the other hand, in each of the subscriber terminals, there is provided a logical circuit 30$e$-1 or 30$e$-2 as shown in FIGS. 14($a$) or 14($b$) according to the order of receiving the two optical signals, instead of the AND circuit 30$e$ (refer to FIG. 13).

The above logical circuit 30$e$-1 is configured with two exclusive OR circuits (EXOR circuits) 31 and 32. The logical circuit 30$e$-2 is also configured with two exclusive OR circuits 33 and 34 (each of the logical circuits 32 and 34 having two input terminals, and either one of two input signals of each of the logical circuits 32 and 34 being inverted and inputted to the input terminal thereof). The logical circuits 30$e$-1 and 30$e$-2 operate inversely according to the order of input data.

Figure 15:
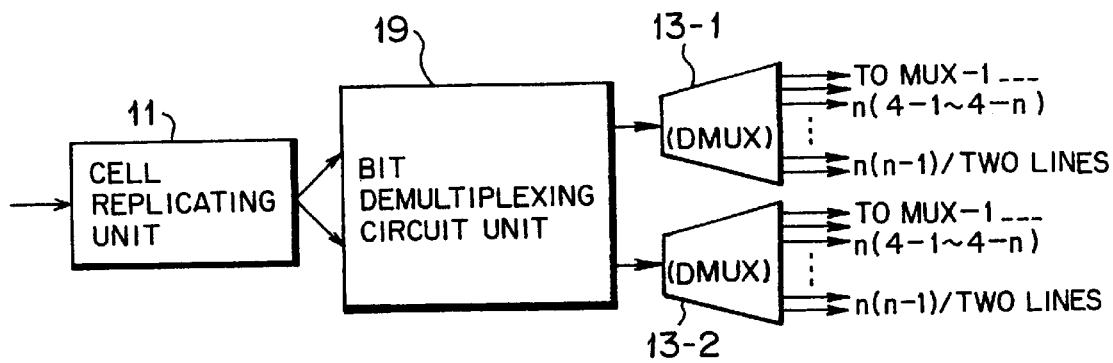
FIG. 15 is a block diagram showing the modification of the first embodiment of this invention.
Figure 16:
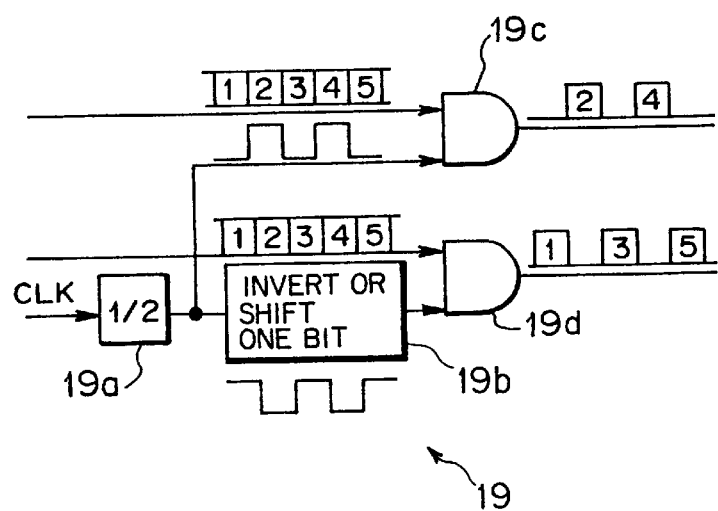
FIG. 16 is a diagram for illustrating an operation of the modification of the first embodiment of this invention.

According to the above first embodiment, each of the demultiplexing switch units 13-1 and 13-2 demultiplex the same transmit signals replicated by the cell replicating unit 11. However, the present invention is not limited to the above example. It is alternatively possible that a bit demultiplexing circuit unit 19 is additionally provided to generate two different transmit signals obtained by demultiplexing bits of the same transmit signals replicated by the cell replicating unit 11, as shown in FIG. 15, for example. The demultiplexing switch units 13-1 and 13-2 further demultiplex the two transmit signals from the bit demultiplexing circuit unit 19.

The bit demultiplexing circuit unit 19 has, as shown in detail in FIG. 15, a frequency dividing circuit 19$a$ for converting a clock signal synchronous with a transmit bit signal into a half frequency, a clock judging circuit 19$b$, and two AND circuits 19$c$ and 19$d$.

Bits of a transmit signal inputted to the cell replicating unit 11 are alternately separated into bits of a transmit signal to be inputted to the demultiplexing switch unit 13-1 and bits of a transmit signal to be inputted to the demultplexing switch unit 13-2, by the cell replicating unit 11 and the bit demultiplexing circuit unit 19.

The cell replicating unit 11 and the bit demultiplexing circuit unit 19 mentioned above function as a bit demultiplexing unit inputted input data addressed to a plurality of the subscriber terminals 30-1 through 30-$m$ as time division multiplexed signals to time division demultiplexes the above input data into two groups of bits.

The demultiplexing switch units 13-1 and 13-2 time division multiplex two data time division demultiplexed by the bit demultiplexing circuit unit 19 into data addressed to the respective subscriber terminals 30-1 through 30-$m$, which function as a data demultiplexing unit.

The multiplexing units 14-1 through 14-$n$, the FIFO memory 15 and the E/O converting units 16-1 through 16-$n$ function as a signal converting unit for converting data time division demultiplexed by the bit demutliplexing circuit unit 19 into optical signals having two optical wavelengths set in advance for each of the subscriber terminals which are destinations.

The optical coupler 18 wavelength division multiplexes the optical signals converted by the signal converting unit for all of the subscriber terminals 30-1 through 30-$m$ and transmits the signals.

Namely, two optical signals having different wavelengths to be received by each of the subscriber terminals 30-1 through 30-$m$ are two sorts of converted data obtained by alternately separating bits thereof.

In this case, in each of the subscriber terminals 30-1 through 30-$m$, an OR circuit is provided instead of the AND circuit 30$e$ (refer to FIG. 13) to restore data in the following stage.

(c) Description of a Second Embodiment

Figure 17:
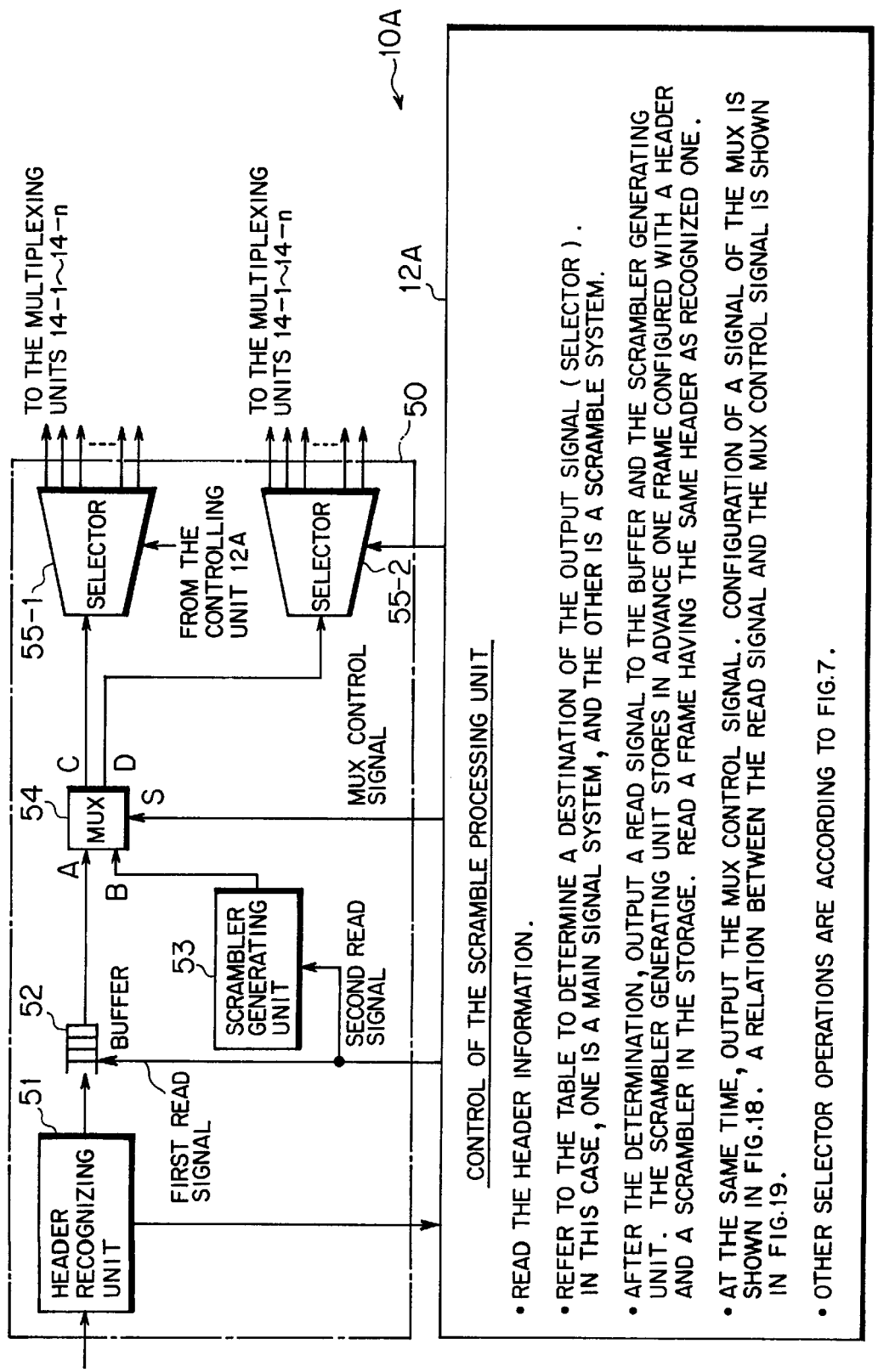
FIG. 17 is a block diagram showing a station according to a second embodiment of this invention.
Figures 18, 19:
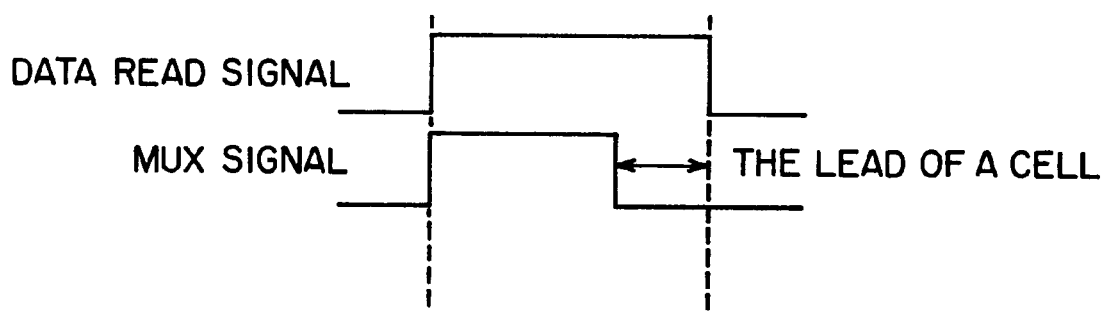
FIGS. 18 and 19 are diagrams for illustrating an operation of the station according to the second embodiment of this invention.

FIG. 17 is a block diagram showing an essential part of a station 10A according to a second embodiment of this invention. The station 10A shown in FIG. 17 is applied similarly to the station 10 in the optical communication system 40 according to the above first embodiment.

The station 10A according to the second embodiment has, differently from that (refer to reference numeral 10) according to the first embodiment, a scramble processing unit 50, instead of the cell duplicating unit 11 and the DMUXs 13-1 and 13-2, and a controlling unit 12A for controlling a process in the scramble processing unit 50. Other structure is basically the same as the first embodiment described above.

The controlling unit 12A has a table for holding destination information correspondingly to header information given by the header attaching unit 17 to control the scramble processing unit 50, the multiplexing units 14-1 through 14-n and the FIFO memory 15 so that transmit signals are converted into optical signals having wavelengths used in the subscriber terminals 30-1 through 30-m on the basis of header information attached to each of transmit cells. As the above table, it is possible to use what conforms to the table 12a shown in FIG. 8, for example.

The scramble processing unit 50 is inputted input data addressed to the subscriber terminals 30-1 through 30-m as time division multiplexed signals to perform a scrambling process on the above input data according to a destination, which has, in detail, a header recognizing unit 51, a buffer, 52, a scrambler generating unit 53, an MUX unit 54 and selectors 55-1 and 55-2.

The header recognizing unit 51 is inputted a cell (or frame) leading pulse or header enable information along with a transmit signal as time division multiplexed data from the header attaching unit 17 to read and recognize header information attached to the transmit cell configuring the time division multiplexed data. A result of the recognition is notified to the controlling unit 12A.

The buffer 52 holds data recognized by the header recognizing unit 51, and outputs the data to the MUX unit 54 in synchronization with a first read signal fed from the controlling unit 12A.

The scrambler generating unit 53 hold in advance data of one frame signal configured with the header information and a scramble signal correspondingly to the result of the header recognition from the header recognizing unit 51. The scrambler generating unit 53 is inputted a second read signal whose leading edge is synchronized with the above first read signal fed from the controlling unit 12A, and outputs a frame including corresponding header information to the MUX unit 54.

As to the first read signal and the second read signal mentioned above, leading edges of the first read signal and the second read signal are in synchronization, but a trailing edge of the second signal is behind a trailing edge of the first read signal used to read the header information (cell leading portion) together with the scramble signal. Whereby, data from the buffer 52 and a corresponding frame from the scrambler generating unit 53 are outputted in synchronization to the MUX unit 54.

The MUX unit 54 is inputted the data from the buffer 52 through an input terminal A, the corresponding frame from the scrambler generating unit 53 through an input terminal B and a control signal from the controlling unit 12A through an input terminal S, and outputs an output signal according to the control signal to the two selectors 55-1 and 55-2.

In concrete, the MUX unit 54 outputs a result of operation of exclusive OR (EXOR) of the data from the buffer 52 and the corresponding frame from the scrambler generating unit 53 when the control signal from the controlling unit 12A is "1", or the data from the buffer 52 to the selector 55-1 through an output terminal C when the control signal from the controlling unit 12A is "0".

Incidentally, the MUX unit 54 outputs the frame from the scrambler generating unit 53 to the selector 55-2 through an output terminal D irrespective of a state of the control signal from the controlling unit 12A.

Each of the selectors 55-1 and 55-2 switches the transmit cell inputted from the MUX unit 54 in response to the control signal based on the table from the controlling unit 12A so that the transmit cell is converted into an optical signal of a predetermined wavelength according to the subscriber terminals 30-1, 30-2, . . . or 30-m which is a destination shown by the header information of the inputted cell.

The controlling unit 12A, the multiplexing units 14-1 through 14-n, the FIFO memory 15 and the E/O converting units 16-1 through 16-n (not shown in FIG. 17) function as a signal converting unit for converting data subjected to the scrambling process in the above scrambling process unit 50 and a scrambler pattern into optical signals having two wavelengths set in advance according to an opposite apparatus which is a destination.

The optical coupler 18 wavelength division multiplexes optical signals converted by the E/O converting units 16-1 through 16-n for all of the subscriber terminals 30-1 through 30-n and transmits the signals.

Each of the subscriber terminals 30-1 through 30-m has an EXOR circuit for performing an exclusive OR operation on receive signals obtained from the two optical signals instead of the AND circuit 30e, as compared with that according to the first embodiment (refer to FIG. 13). Namely, by the operation performed by the EXOR circuit, data scrambled on the transmitting side is descrambled.

In this case, it is unnecessary to provide a descrambler on the subscriber's side, or it is possible to prepare the descrambler for each subscriber.

Next, description will be made of an operation of the optical communicating system with the above structure according to the second embodiment.

Namely, when the station 10 transmits wavelength division multiplexed optical signals to the plural subscriber terminals 30-1 through 30-m over the optical communication network 20, the station 10 converts a data signal and a scramble signal for each of the subscriber terminals 30-1 through 30-m using a combination of two optical wavelengths set in advance for each of the plural subscriber terminals 30-1 through 30-m into an optical signal to generate the same, and wavelength division multiplexes the generated optical signals to transmit the same.

At this time, the two optical signals for each of the subscriber terminals 30-1 through 30-m have different wavelengths. If the number of times of wavelength division multiplexing of the optical wavelengths which can be transmitted over the optical communication network 20 is even, a main signal system and data of a scramble system addressed to the same subscriber are converted in the same time slot of these two optical signals. If the number of times of the wavelength division multiplexing is even, the main signal system and data of the scramble system addressed to the same subscriber are converted in different time slots.

In each of the subscriber terminals 30-1 through 30-m, the wavelength filtering units 30c-1 and 30c-2 filter the two optical signals having different wavelengths uniquely set in advance among the wavelength division multiplexed optical signals transmitted from the station 10 over the optical communication network 20, after that, the two O/E converting units 30*d*-1 and 30*d*-2 convert the above filtered two optical signals having different wavelengths into electric signals so as to restore data addressed to its own apparatus on the basis of the above two converted electric signals (main signal system data and scramble system data).

At this time, even if an optical signal addressed another terminal is included in one of receive optical wavelengths, it is possible to prevent the receive signal addressed to another terminal from being regenerated when it is found from a result of the operation by the AND circuit 30*e* that matching with a receive signal obtained from another optical wavelength fails. Whereby, security (that is, privacy protection) between the subscriber terminals can be secured when receive data is regenerated.

According to the second embodiment of this invention, it is possible to convert data subjected to the scrambling process in the scramble processing unit 50 and the scramble pattern into optical signals having two optical wavelengths set in advance according to an opposite apparatus which is a destination to transmit the optical signal. Therefore, it is possible to configure an optical communicating system which can accommodate subscriber terminals m [=n (n−1)/2] larger in number than wavelengths n which can be wavelength division multiplexed so as to efficiently use a transmission band of the optical communicating system and increase extensibility of the network while keeping an existing wavelength division multiplexing transmission performance of the network.

Further, it is possible to set a combination of two wavelengths for each of the plural subscriber terminals 30-1 through 30-*m* to transmit signals, similarly to the above first embodiment. It is therefore possible to improve a communication accuracy while preventing a transmit signal addressed to a certain subscriber terminal 30-*i* from being transmitted to another subscriber terminal 30-*j* so as to realize privacy protection, that is, improve communication security.

(d) Description of a Third Embodiment

Figure 20:
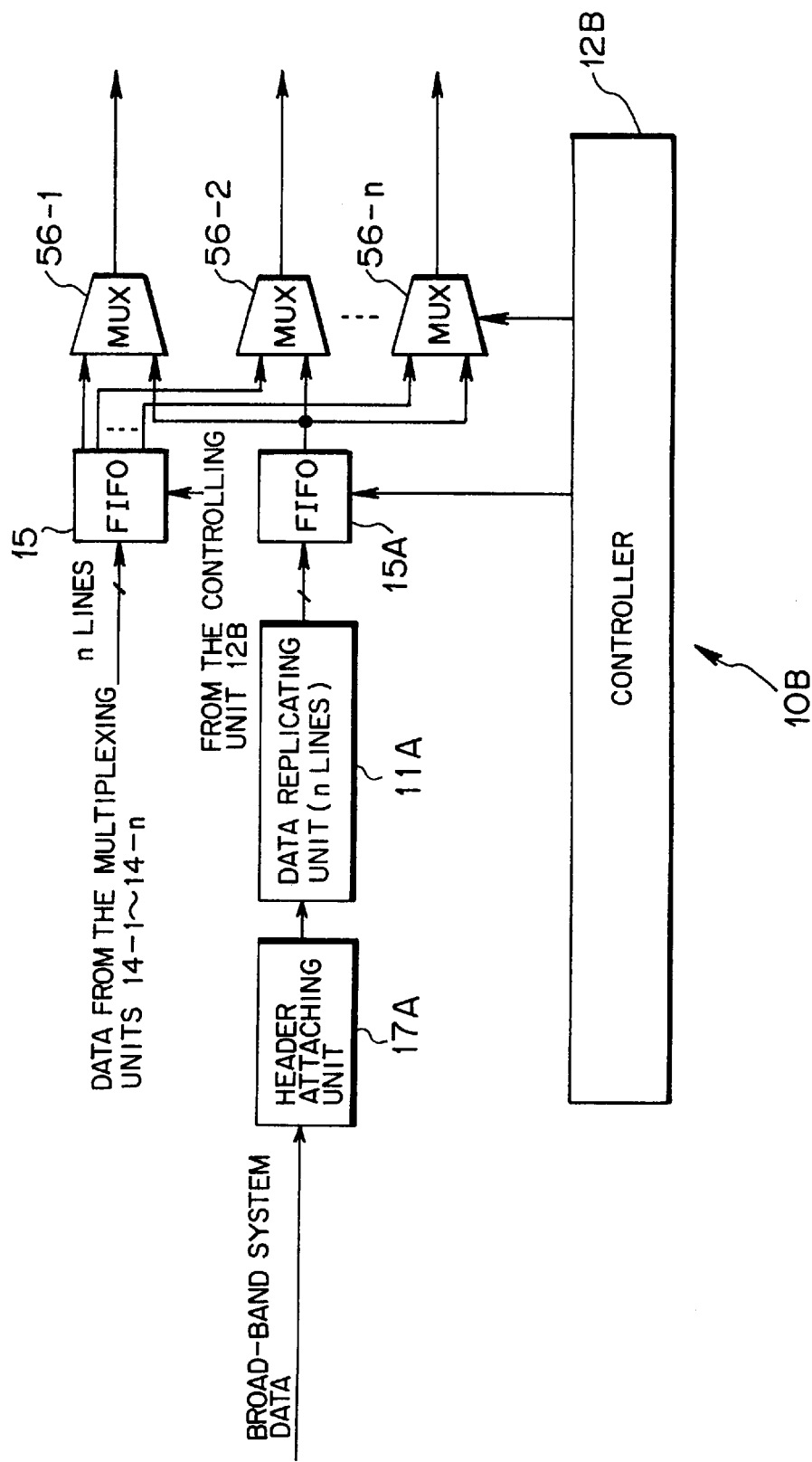
FIG. 20 is a block diagram showing a station according to a third embodiment of this invention.

FIG. 20 is a block diagram showing a station 10B according to a third embodiment of this invention. The station 10B shown in FIG. 20 is also applied to the optical communicating system 40, similarly to the above first and second embodiments.

As compared with the above first and second embodiments (refer to reference numerals 10 and 10A), the station 10B according to the third embodiment can transmit data which does not require privacy protection as wavelength division multiplexed optical signals along with data (private data) requiring privacy protection. Other structure of the station 10B is basically the same as those according to the first and second embodiments.

The station 10B shown in FIG. 20 has a transmitting system for private data (refer to reference numerals 11, 13-1, 13-2, 14-1 through 14-*n* and 15) similarly to the first embodiment, besides a header attaching unit 17A, a data replicating unit 11A and an FIFO memory 15A as a data transmitting system which does not require privacy protection and MUXs 56-1 through 56-*n* for time division multiplexing the private data and data not requiring privacy protection.

Incidentally, like reference numerals in FIG. 20 denote like or corresponding parts in FIG. 3.

The header attaching unit 17A configuring the data transmitting system for data not requiring privacy protection attaches header information to a leading portion of a cell (frame) configuring data not requiring privacy protection such as data of broad-band system (for example, CATV; Cable Television or the like). The header information is assumed to include information showing that the data does not require privacy protection.

The data replicating unit 11A replicates the broad-band system data to which the header information is attached by the header attaching unit 17A into n data and outputs the n data in parallel. The FIFO memory 15A is inputted the n (n systems of) data replicated by the data replicating unit 11A in parallel, and outputs the n systems of broad-band system data in synchronization to the MUXs 56-1 through 56-*n*.

Each of the MUXs 56-1 through 56-*n* is inputted data not requiring privacy protection from the FIFO memory 15A along with the private data from the FIFO memory 15, and selectively outputs the data on the basis of a select signal from the controlling unit 12B. The outputted data is converted into optical signals in the E/O converting unit 16-*k* in the following stage.

In concrete, private data [whose data length corresponds to (n−1) cells] is inputted to the MUX 56-*k* (k; an arbitrary integer from 1 to n) from the multiplexing unit 14-*k* via the FIFO memory 15, besides the broad-band system data is also inputted with an arbitrary data length [corresponding to X (X; an integer not less than 0) cells] to the MUX 56-*k*.

The controlling unit 12B outputs select signals as shown in FIGS. 22(*a*) and 22(*b*) to the FIFO memory 15 and the FIFO memory 15A. Whereby, the MUX 56-*k* receives data from either the FIFO memory 15 or the FIFO memory 15A so that the data is converted into an optical signal of a predetermined wavelength in the E/O converting unit 16-K in the following stage.

Namely, the private data having a data length corresponding to (n−1) cells from the FIFO memory 15 and the broad-band system data having a data length corresponding to X cells configure transmit data of one cycle as a whole.

The controlling unit 12B controls a timing of outputting data from the MUX 56-*k* to the E/O converting unit 16-*k* by referring to a table 12*b* as shown in FIG. 23, for example.

The table 12*b* shown in FIG. 23 holds information of the order of reading signals in the MUXs 56-1 through 56-*n* along with information similar to that held in the above-mentioned table 12*a* shown in FIG. 8 for private data, correspondingly to the header information ("0100100...", for example), and table information for broad-band system data.

Namely, the table 12*b* holds, as the table information for broad-band system data configuring the table 12*b*, information about the order of outputting transmit cells to the subscribers 30-1 through 30-*m*, correspondingly to the header information ("111010...", for example) attached to the broad-band system data (in this case, it is defined as the information about the order of outputting transmit cells that a timing length corresponds to cells in an integer number not less than "1").

Accordingly, the controlling unit 12B, the multiplexing units 14-1 through 14-*n* (not shown in FIG. 20), the FIFO memories 15 and 15A, the header attaching unit 17A, the data replicating unit 11A, the MUXs 56-1 through 56-*n* and the E/O converting units 16-1 through 16-*n* configure a signal converting unit for converting data including plural destinations transmit information to be transmitted to a plurality of destinations without the above privacy protection along with private information to be prevented from being received by a subscriber terminal other than the subscriber terminals 30-1 through 30-*m* which are the destinations into optical signals.

An operation of the optical communicating system according to the third embodiment of this invention will be described hereinafter.

As to private data, n data [each input data length corresponding to (n−1) cell lengths] are inputted from the multiplexing units 14-1 through 14-n to the FIFO memory 15. As to broad-band system data, the header information is attached by the header attaching unit 17A, and n broad-band system data to which the header information has been attached are outputted from the data replicating unit 11A to the FIFO memory 15A.

A timing of outputting data from each of the FIFO memories 15 and 15A to the MUXs 56-1 through 56-n is controlled by outputting a select signal from the controlling unit 12B with reference to the table 12b.

In concrete, the controlling unit 12B outputs the select signal to each of the FIFO memories 15 and 15A so that the private data of (n−1) cell lengths from the FIFO memory 15 and the broad-band system data of X cell lengths configure transmit data of one cycle as a whole.

Even if no broad-band system data to be transmitted to the FIFO memory 15A is accumulated, the controlling unit 12B outputs the select signal of at least not less than one cell length so that idle data of one cell length is inserted as the broad-band system data between the private data.

Data addressed to each of the subscriber terminals 30-1 through 30-m can be transmitted using a plurality of wavelengths for data addressed to each of the subscriber terminals 30-1 through 30-m, similarly to the private data. However, it is possible to efficiently use a band of the transmission route by providing the FIFO memory 15A and the MUXs 56-1 through 56-n.

The station 10B according to the above third embodiment transmits data not requiring privacy protection to all of the subscriber terminals 30-1 through 30-m. However, the present invention is not limited to the above example. It is alternatively possible that the station 10B is multicast connected to arbitrary subscriber terminals 30-1 through 30-m, and data not requiring privacy protection is transmitted as the multi-band system data. It is thereby possible to effectively use resources of the optical communication network 20 to improve the transmission efficiency.

In other words, the controlling unit 12B, the multiplexing units 14-1 through 14-n (not shown in FIG. 20), the FIFO memories 15 and 15A, the header attaching unit 17A, the data replicating unit 11A, the MUXs 56-1 through 56-n and the E/O converting units 16-1 through 16-n configuring the signal converting unit convert plural destinations transmit information into optical signals using optical wavelengths set for each of the subscriber terminals 30-1 through 30-m which are destinations.

If the number of times of wavelength division multiplexing n is "4" (used wavelengths are λ 1 through λ 4) and the number of subscribers is "6" (user IDs assigned to the respective subscriber terminals 30-1 through 30-6 are "1" through "6") similarly to the above case shown in FIG. 9, for example, the controlling unit 12B transmits private data to each of the subscriber terminals 30-1 through 30-6 by referring to a table 12b' as shown in FIG. 24, for example.

Figure 25:
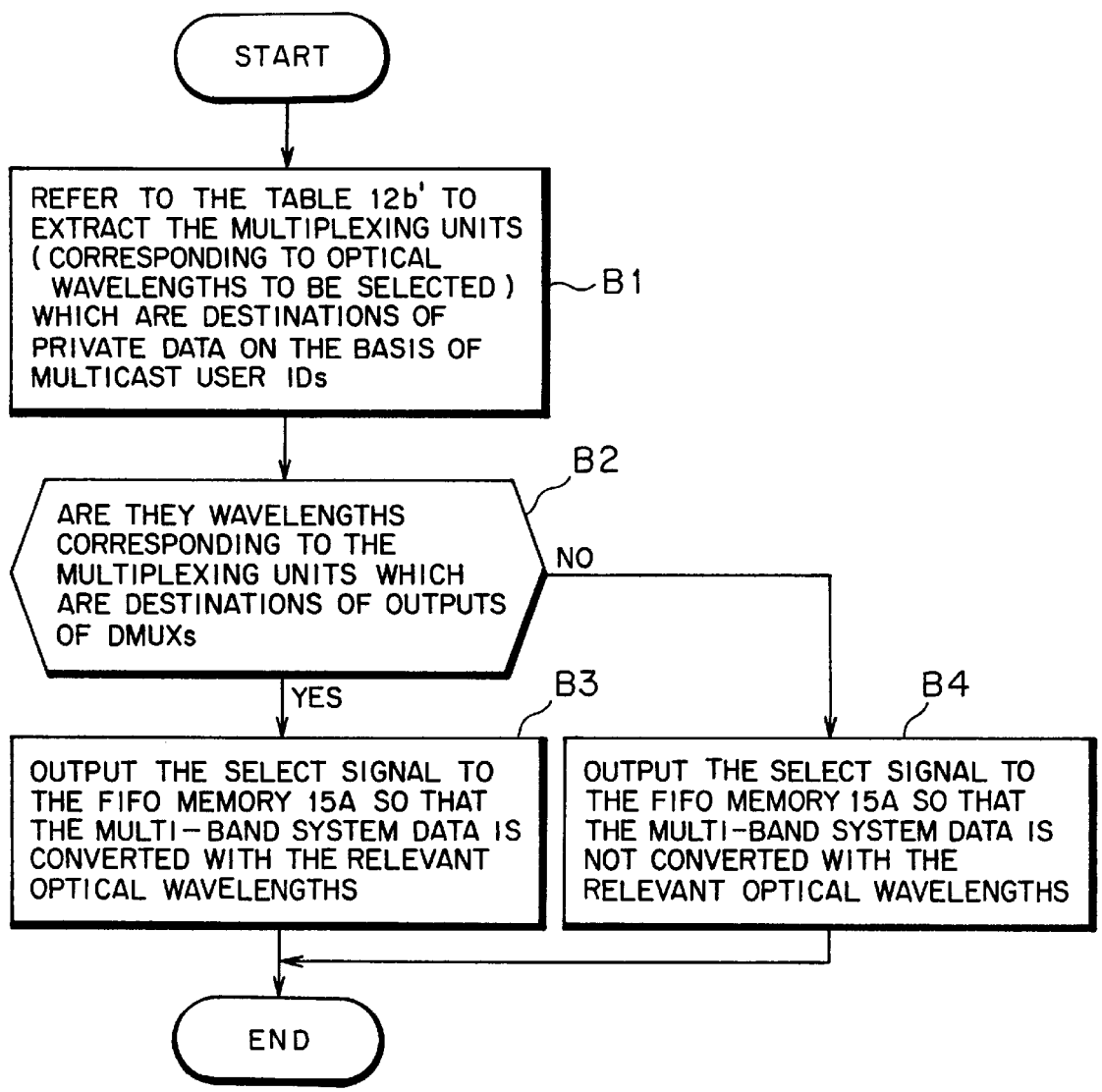
FIG. 25 is a flowchart for illustrating an operation of the station according to the modification of the third embodiment of this invention.
Figure 26:
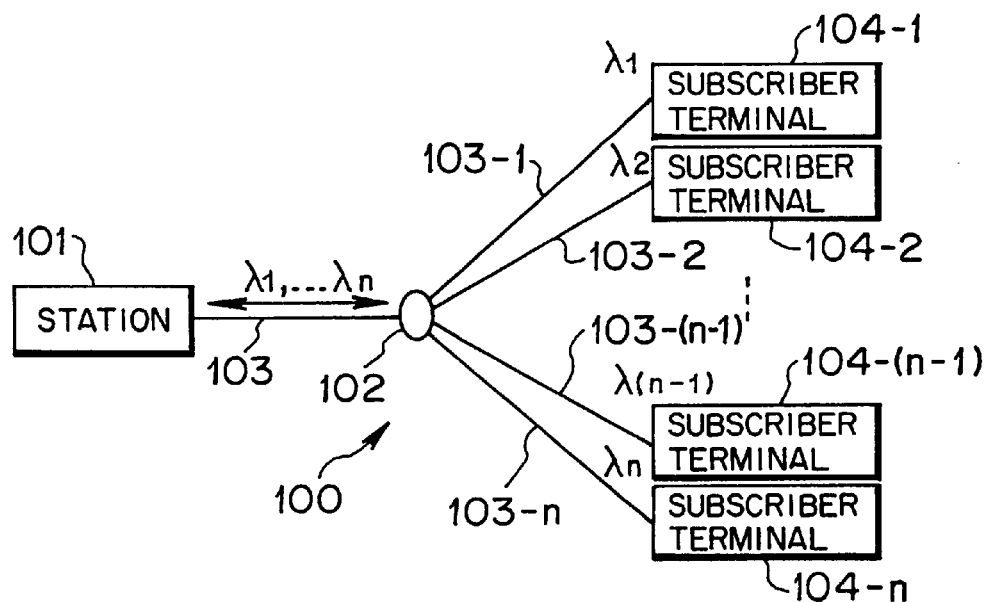
FIG. 26 is a block diagram showing an example of an optical communicating system for providing a multi-media service.
Figure 27:
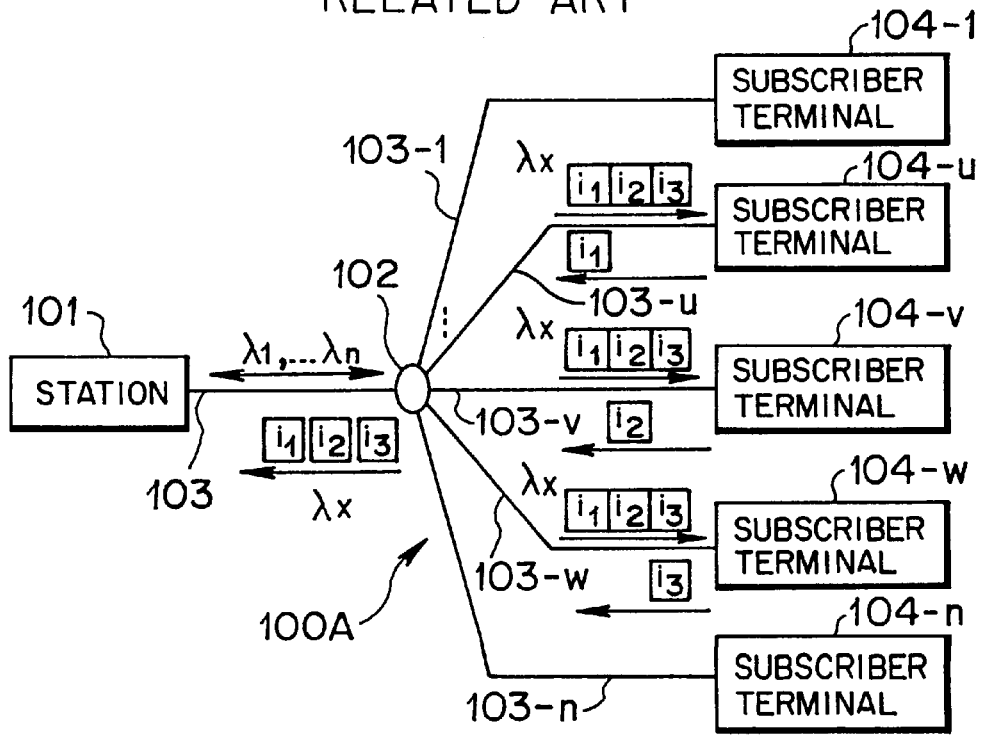
FIG. 27 is a block diagram showing an optical communicating system in which a wavelength division multiplexing system is combined with a time division multiplexing system.

As to the multi-band system data, the controlling unit 12B can transmit the multi-band system data to the multicast connected subscriber terminals 30-1 through 30-6 by performing a control as shown in FIG. 25.

The controlling unit 12B refers to the table 12b on the basis of user IDs that should be multicast connected stored in a ROM (Read Only Memory) or a RAM (Random Access Memory) in advance to extract information of the multiplexing units 14-1 through 14-1 (corresponding to sorts of wavelengths that should be selected) which are destinations of outputs of the DMUXs 13-1 and 13-2 (Step B1).

In this case, discrimination information indicating a terminal (user) that should be multicast connected is attached in the table 12b', for example. The controlling unit 12B can thereby discriminate the terminals 30-1, 30-4 and 3-5 that should be multicast connected (user ID information enclosed with a circle is attached the discrimination information indicating multicasting thereto in the table 12b' shown in FIG. 24).

The controlling unit 13B outputs the select signal to the FIFO memory 15A in order to transmit the multi-band system data using optical wavelengths that should be selected when the subscriber terminals transmit private data.

In concrete, the controlling unit 12B refers to the table 12b'. In the table 12b', there are registered the multiplexing units 14-1 through 14-3 as destination of outputs of the DMUXs 13-1 and 13-2 corresponding to the destination subscriber terminals 30-1, 30-4 and 30-5. The controlling unit 12B extracts the registered information so as to recognize that E/O converting units which are destinations of the outputs are the E/O converting units 16-1 through 16-3 (wavelengths are λ 1 through λ 3) (Step B1).

On the basis of the extracted optical wavelength information, the multi-band system data is converted with optical wavelengths λ 1 through λ 3. On the other hand, the controlling unit 12B generates the select signal for the FIFO memory 15A in order to prevent the multi-band system data from being converted with a wavelength λ 4 not selected (Steps B2 through B4).

In this case, it is possible to configure the station 10B such as to accumulate idle data with respect to data of a system converted into an optical signal of a wavelength 4 not selected (accumulated data in the FIFO memory 15A to be outputted to the MUX 56-4). It is thereby possible to transmit the multi-band system data to the multicast connected subscriber terminals 30-1, 30-4 and 30-5 while securing synchronization of a redundant optical signal when the private data is transmitted.

According to the third embodiment of this invention, it is possible to convert data including the plural destinations transmit information to be transmitted to a plurality of destination without the above privacy protection into optical signals along with private information that should be prevented from being received by a subscriber terminal other than the subscriber terminals 30-1 through 30-m which are destinations. Accordingly, the third embodiment of this invention has the same advantages as each of the above embodiments. Additionally, the third embodiment enables wavelength division multiplex transmission while selecting wavelengths according to characteristics of a data system to be transmitted, thereby improving utility of the optical communicating system so as to remarkably improve efficiency of a used band in the transmission route.

(e) Others

If only the broad-band system data is transmitted in the optical system according to each of the above embodiments, each of the stations 10, 10A and 10B can generate optical signals without using a combination of p optical wavelengths set for each of the subscriber terminals 30-1 through 30-m which are destinations by a setting of each of the controlling unit 12, 12A and 12B.

When either one of the two O/E converting units 30c-1 and 30c-2 in the subscriber terminal 30-1, 30-2, ... or 30-m according to each of the above embodiments becomes unusable, a function of the AND circuit 30e can be switched to a function of the OR circuit, whereby the data can be restored on the basis of electric signals converted by the remaining usable O/E converting unit 30c-1 or 30c-2.

When at least one of the O/E converting units 30c-1 and 30c-2 in any one of a plurality of the subscriber terminals 30-1 through 30-m in each of the above embodiments becomes unusable, the station 10, 10A or 10B performs the scrambling process on data to be transmitted to the relevant subscriber terminal 30-1, 30-2, . . . or 30-m, then generates optical signal for the relevant subscriber terminal 30-1, 30-2, . . . or 30-m using at least one optical wavelength which can be converted into an electric signal by the usable optical converting unit between the two O/E converting units 30c-1 and 30c-2 and transmits the signal. The relevant subscriber terminal 30-1, 30-2, . . . or 30-m converts at least one optical signal of a wavelength between two filtered optical signals having different wavelengths into an electric signal, performs the descrambling process on the converted electric signal to restore the data addressed to itself.

When at least one of the O/E converting units 30c-1 and 30c-2 becomes unusable in either one of a plurality of the subscriber terminals 30-1 through 30-m, the station 10, 10A or 10B performs scrambling processes uniquely set for the respective subscriber terminals 30-1 through 30-m on data to be transmitted to all of the subscriber terminals 30-1 through 30-m, generates each of optical signals using at least one optical wavelength different from one another and transmits the optical signal to each of the subscriber terminals 30-1 through 30-m. Each of the subscriber terminals 30-1 through 30-m filters the above optical signal of at least one optical wavelength, converts the filtered optical signal into an electric signal in a usable O/E converting unit, and performs a unique descrambling process on the converted electric signal to restore data addressed to itself.

Further, it is possible to apply the contents described as the modification of the first embodiment to the second or the third embodiment if necessary.

What is claimed is:

1. An optical transmitting apparatus for transmitting wavelength division multiplexed optical signals to a plurality of opposite apparatus as destinations over an optical communication network comprising:
    an optical signal generating unit for generating an optical signal for each of said plurality of opposite apparatus using a combination of p (p; an integer not less than 2) optical wavelengths set in advance for each of said plurality of opposite apparatus; and
    a wavelength division multiplexing transmitting unit for wavelength division multiplexing the optical signals generated by said optical signal generating unit and transmitting said multiplexed optical signals, wherein said optical signal generating unit comprises
        a data replicating unit inputted input data addressed to said plurality of opposite apparatus as a time division multiplexed signal to replicate said input data into p data,
        a data demultiplexing unit for time division demultiplexing each of said p data replicated by said data replicating unit into data for said respective opposite apparatus, and
        a signal converting unit for converting said data demultiplexed by said data demultiplexing unit into an optical signal having p optical wavelengths set in advance according to an opposite apparatus which is a destination and outputting the optical signal.

2. The optical transmitting apparatus according to claim 1, wherein said signal converting unit comprises:
    a plurality of multiplexing units for multiplexing the data demultiplexed by said data demultiplexing unit, which should be converted into optical signals having optical wavelengths according to a destination; and
    a plurality of optical converting units being able to convert said plurality of multiplexed data from said plurality of multiplexing units into optical signals having optical wavelengths different from one another.

3. The optical transmitting apparatus according to claim 2, wherein when said signal converting unit converts said multiplexed data into p optical signals according to said destination, said signal converting unit provides dependency to the order of optical wavelengths that should be converted into said optical signals.

4. The optical transmitting apparatus according to claim 1, wherein said signal converting unit converts data including plural destinations transmit information without privacy protection that should be transmitted to a plurality of destinations along with private information that should be prevented from being received by an apparatus other than said opposite apparatus which are destinations into said optical signals.

5. The optical transmitting apparatus according to claim 4, wherein said signal converting unit converts said plural destinations transmit information into optical signals using optical wavelengths set for each of said opposite apparatus which are destinations.

6. The optical transmitting apparatus according to claim 2, wherein when only broad-band system data is transmitted, said optical signal generating unit generates optical signals without using a combination of p optical wavelengths set in advance for each of said opposite apparatus which are destinations.

7. An optical transmitting apparatus for transmitting wavelength division multiplexed optical signals to a plurality of opposite apparatus as destinations over an optical communication network comprising:
    an optical signal generating unit for generating an optical signal for each of said plurality of opposite apparatus using a combination of p (p; an integer not less than 2) optical wavelengths set in advance for each of said plurality of opposite apparatus; and
    a wavelength division multiplexing transmitting unit for wavelength division multiplexing the optical signals generated by said optical signal generating unit and transmitting said multiplexed optical signals, wherein said optical signal generating unit comprises
        a bit demultiplexing unit inputted input data addressed to said plurality of opposite apparatus as time division multiplexed signals to time division demultiplex said input data into p (p: an integer not less than 2) groups of bits,
        a data demultiplexing unit for time division demultiplexing the data time division demultiplexed into said p groups by said bit demultiplexing unit into data for said respective opposite apparatus, and
        a signal converting unit for converting said data time division demultiplexed by said bit demultiplexing unit into an optical signal having p optical wavelengths set in advance for each of said opposite apparatus which are destinations, wherein said wavelength multiplexing transmitting unit wavelength division multiplexes optical signals converted by said signal converting unit for all of said opposite apparatus and transmits said multiplexed optical signals.

8. An optical transmitting apparatus for transmitting wavelength division multiplexed optical signals to a plurality of opposite apparatus as destinations over an optical communication network comprising:
    an optical signal generating unit for generating an optical signal for each of said plurality of opposite apparatus using a combination of p (p; an integer not less than 2) optical wavelengths set in advance for each of said plurality of opposite apparatus; and a wavelength division multiplexing transmitting unit for wavelength division multiplexing the optical signals generated by said optical signal generating unit and transmitting said multiplexed optical signals, wherein said optical signal generating unit comprises a scramble processing unit inputted input data addressed to said plurality of opposite apparatus as time division multiplexed signals to perform a scrambling process on said input data according to a destination, and a signal converting unit for converting the data subjected to the scrambling process by said scramble processing unit and a scrambler pattern into optical signals having p wavelengths set in advance according to an opposite apparatus which is a destination, wherein said wavelength division multiplexing-transmitting unit wavelength division multiplexes optical signals converted by said signal converting unit for all of said opposite apparatus and transmits the multiplexed optical signals.

9. An optical receiving apparatus for receiving optical wavelength division multiplexing optical signals from an transmitting apparatus over an optical communication network comprising:

a wavelength filtering unit for filtering signals of p (p; an integer not less than 2) optical wavelengths set in advance for each of a plurality of optical receiving apparatus including said optical receiving apparatus and other receiving apparatus among wavelength division multiplexed signals transmitted from a transmitting side apparatus over an optical communication network, said signals of wavelengths being so set as to differ from one another according to each of plurality of receiving apparatus;

p photoelectric converting units for converting said signals of said p optical wavelengths filtered by said wavelength filtering unit into electric signals; and a data restoring unit for restoring data addressed to its own apparatus on the basis of said electric signals converted by said photoelectric converting units.

10. The optical receiving apparatus according to claim 9, wherein when either one of said p photoelectric converting units becomes unusable, said data restoring unit restores said data on the basis of electric signals converted by remaining usable photoelectric converting units.

11. An optical communicating method for transmitting wavelength division multiplexed optical signals from a transmitting side apparatus to a plurality of receiving side apparatus over an optical communication network, said optical communicating method comprising:

when a transmitting side apparatus transmits wavelength division multiplexed optical signals to a plurality of receiving side apparatus opposite to said transmitting side apparatus over an optical communication network, on said transmitting side apparatus (A) generating optical signals for each of said plural receiving side apparatus on the basis of a combination of p (p: an integer not less than 2) optical wavelengths set in advance for each of said plural receiving side apparatus said combination of p wavelengths being so set as to differ from one another according to each of said plurality of receiving side apparatus;

(B) wavelength division multiplexing said generated optical signals;

(C) transmitting said optical signals to said receiving side apparatus; on each of said plurality of receiving side apparatus, (D) filtering p optical signals having different wavelengths uniquely set in advance among the wavelength division multiplexed signals transmitted from said transmitting side apparatus over said optical communication network;

(E) converting said filtered p optical signals having different wavelengths into electric signals in p photoelectric converting units; and (F) restoring data addressed to itself on the basis of said converted electric signals.

12. The optical communicating method according to claim 11, wherein when at least one of said photoelectric converting units becomes unusable in any one of said plurality of receiving side apparatus, said transmitting side apparatus performs a scrambling process on data that should be transmitted to the relevant receiving side apparatus, then generates optical signals for said receiving side apparatus using at least one optical wavelength which can be converted into an electric signal by a usable photoelectric converting unit among said p photoelectric converting units and transmits the optical signals; and said receiving apparatus converts an optical signal of at least one optical wavelength among said filtered p optical signals having different wavelengths into an electric signal, and performs a descrambling process on said converted electric signal to restore data addressed to itself.

13. The optical communicating method according to claim 11, wherein when at least one of said photoelectric converting units becomes unusable in any one of said plurality of receiving side apparatus, said transmitting apparatus performs scramble processings uniquely set for said receiving side apparatus, respectively, on data that should be transmitted to all of said receiving side apparatus, generates optical signals using at least one optical wavelength different according to each of said receiving side apparatus to transmit said optical signal; and each of said receiving side apparatus filters said optical signals of at least one optical wavelength, converts said filtered optical signals into electric signals by a usable photoelectric converting units, and performs a unique descrambling process on said converted electric signals to restore the data addressed to itself.

14. An optical transmitting apparatus for transmitting wavelength division multiplexed optical signals to a plurality of opposite apparatus as destinations over an optical communication net work, comprising:

an optical signal generating unit inputted input data addressed to said plurality of opposite apparatus as time division multiplexed signals to generate an optical signal for each of said plurality of opposite apparatus by converting said time division multiplexed signals into said optical signals using a combination of p (p being an integer not lees than 2) optical wavelengths set in advance for at least one of said plurality of opposite apparatus by each time slot; and a wavelength division multiplexing transmitting unit for wavelength division multiplexing the optical signals generated by said optical signal generating unit and transmitting said multiplexed optical signals.

15. An optical receiving apparatus for receiving optical wavelength division multiplexing optical signals from an optical transmitting apparatus over an optical communication network, said optical receiving apparatus comprising:

- a wavelength filtering unit for filtering signals of p (p: an integer not less than 2) optical wavelengths set in advance for at least one of a plurality of receiving apparatus including said optical receiving apparatus and other optical receiving apparatus by each time slot among wavelength division multiplexed signals transmitted from a transmitting side apparatus over an optical communication network;
- (p) photoelectric converting units for converting said signals of said p optical wavelengths filtered by said wavelength filtering unit into electric signals; and
- a data restoring unit for restoring data addressed to its own apparatus on the basis of said electric signals converted by said photoelectric converting units.

16. An optical communicating method for transmitting wavelength division multiplexed optical signals from a transmitting side apparatus to a plurality of receiving side apparatus over an optical communication network, said optical communicating method comprising the steps of:

on said transmitting side apparatus

- (A) generating optical signals for each of said plural receiving side apparatus on the basis of a combination of p (p: an integer not less than 2) optical wavelengths set in advance for at least one of said plurality of receiving side apparatus including said receiving side apparatus by each time slot;
- (B) wavelength division multiplexing said generated optical signals;
- (C) transmitting said optical signals to said receiving side apparatus; on each of said plurality of receiving side apparatus,
- (D) filtering p optical signals having different wavelengths uniquely set in advance among the wavelength division multiplexed signals transmitted from said transmitting side apparatus over said optical communication network;
- (E) converting said filtered p optical signals having different wavelengths into electric signals in (p) photoelectric converting units; and
- (F) restoring data addressed to itself on the basis of said converted electric signals.

17. An optical transmitting apparatus for transmitting wavelength division multiplexed optical signals to a plurality of opposite apparatus as destinations over an optical communication network comprising:

- an optical signal generating unit inputting input data addressed to said plurality of opposite apparatus as time division multiplexed signals to generate an optical signal for each of said plurality of opposite apparatus by converting said time division multiplexed signals into said optical signal by using a combination of p (p; an integer not less then 2) optical wavelengths set in advance for each of said plurality of opposite apparatus; and
- a wavelength division multiplexing transmitting unit wavelength division multiplexing the optical signals generated by said optical signal generating unit and transmitting said multiplexed optical signals.

18. The optical transmitting apparatus according to claim 2, wherein said combination of p wavelengths is so set as to differ from one another according to each of said opposite apparatus.

* * * * *

UNITED STATES PATENT AND TRADEMARK OFFICE
CERTIFICATE OF CORRECTION

PATENT NO. : 6,215,567 B1
DATED : April 10, 2001
INVENTOR(S) : Yuji Tochio, et al.

It is certified that error appears in the above-identified patent and that said Letters Patent is hereby corrected as shown below:

<u>Column 28,</u>
Line 52, change "net work" to -- network --.
Line 59, change "lees" to -- less --.

Signed and Sealed this

Sixth Day of November, 2001

Attest:

*Nicholas P. Godici*

*Attesting Officer*

NICHOLAS P. GODICI
*Acting Director of the United States Patent and Trademark Office*